(12) United States Patent
Chu et al.

(10) Patent No.: US 11,544,344 B2
(45) Date of Patent: Jan. 3, 2023

(54) REMOTE WEB BROWSING SERVICE

(71) Applicant: Citrix Systems, Inc., Fort Lauderdale, FL (US)

(72) Inventors: Xiaolu Chu, Nanjing (CN); Yuran Ou, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 336 days.

(21) Appl. No.: 16/684,723

(22) Filed: Nov. 15, 2019

(65) Prior Publication Data

US 2021/0133274 A1 May 6, 2021

Related U.S. Application Data

(63) Continuation of application No. PCT/CN2019/115871, filed on Nov. 6, 2019.

(51) Int. Cl.
*G06F 15/16* (2006.01)
*G06F 16/957* (2019.01)
*G06F 16/958* (2019.01)

(52) U.S. Cl.
CPC ...... *G06F 16/9574* (2019.01); *G06F 16/9577* (2019.01); *G06F 16/972* (2019.01)

(58) Field of Classification Search
CPC . G06F 16/9574; G06F 16/9577; G06F 16/972

USPC .......................................................... 709/203
See application file for complete search history.

(56) References Cited

U.S. PATENT DOCUMENTS

| 9,792,266 B1* | 10/2017 | Armstrong | G06F 40/143 |
| 10,242,023 B2* | 3/2019 | Shukla | H04L 67/10 |
| 2014/0108542 A1* | 4/2014 | Cheng | H04L 67/1095 709/204 |
| 2019/0020715 A1* | 1/2019 | Haviv | H04L 67/1095 |
| 2019/0026065 A1* | 1/2019 | Handrigan | G06F 9/54 |

OTHER PUBLICATIONS

"WEBGAP, Remote Browser Isolation Technology", accessed via https://webgap.io/browser-isolation-technology.html on Jan. 9, 2020, and related materials accessible at https://webgap.io/.

* cited by examiner

*Primary Examiner* — Alan S Chou
(74) *Attorney, Agent, or Firm* — Daly, Crowley, Mofford & Durkee, LLP

(57) ABSTRACT

A computing system may perform a method that involves generating a document object model (DOM) at a host web browser representing contents of a web page, providing data to a first endpoint device enabling replication of the DOM to display the contents of the web page in a web browser of the first endpoint device, detecting a request to access the web page via a second endpoint device, and providing data to the second endpoint device to replicate the DOM to enable access to the web page in the same fashion as the first endpoint device.

18 Claims, 16 Drawing Sheets

REMOTE WEB BROWSING SERVICE

CROSS-REFERENCE TO RELATED APPLICATIONS

This application is a continuation of and claims the benefit under 35 U.S.C. § 120 and 35 U.S.C. § 365(c) to International Application PCT/CN2019/115871, entitled REMOTE WEB BROWSING SERVICE, with an international filing date of Nov. 6, 2019, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a computing system performs a method that involves receiving a request from a first endpoint device to access a web page, where the web page is accessible via a web browser of the first endpoint device in communication with a host web browser of the computing system. The method further involves generating a DOM at the host web browser representing contents of the web page, providing data to the web browser enabling replication of the DOM at the first endpoint device to display the contents of the web page in the web browser, detecting a change in access to the web page via the first endpoint device to a second endpoint device, and providing data to the second endpoint device to replicate the web page based on the DOM so as to enable continued access to the web page from the second endpoint device in the same fashion as the first endpoint device.

In other of the disclosed embodiments, a computing system performs a method that involves receiving contents of a web page, generating, at a host web browser, a document object model (DOM) representing the contents of the web page, providing data to a first web browser of a first endpoint device, where the data enables replication of the DOM at the first endpoint device so as to display the contents of the web page in the first web browser, and providing the data to a second web browser of a second endpoint device, the data enabling replication of the DOM at the second endpoint device so as to enable the second web browser access to the web page in a same fashion as the first endpoint device.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
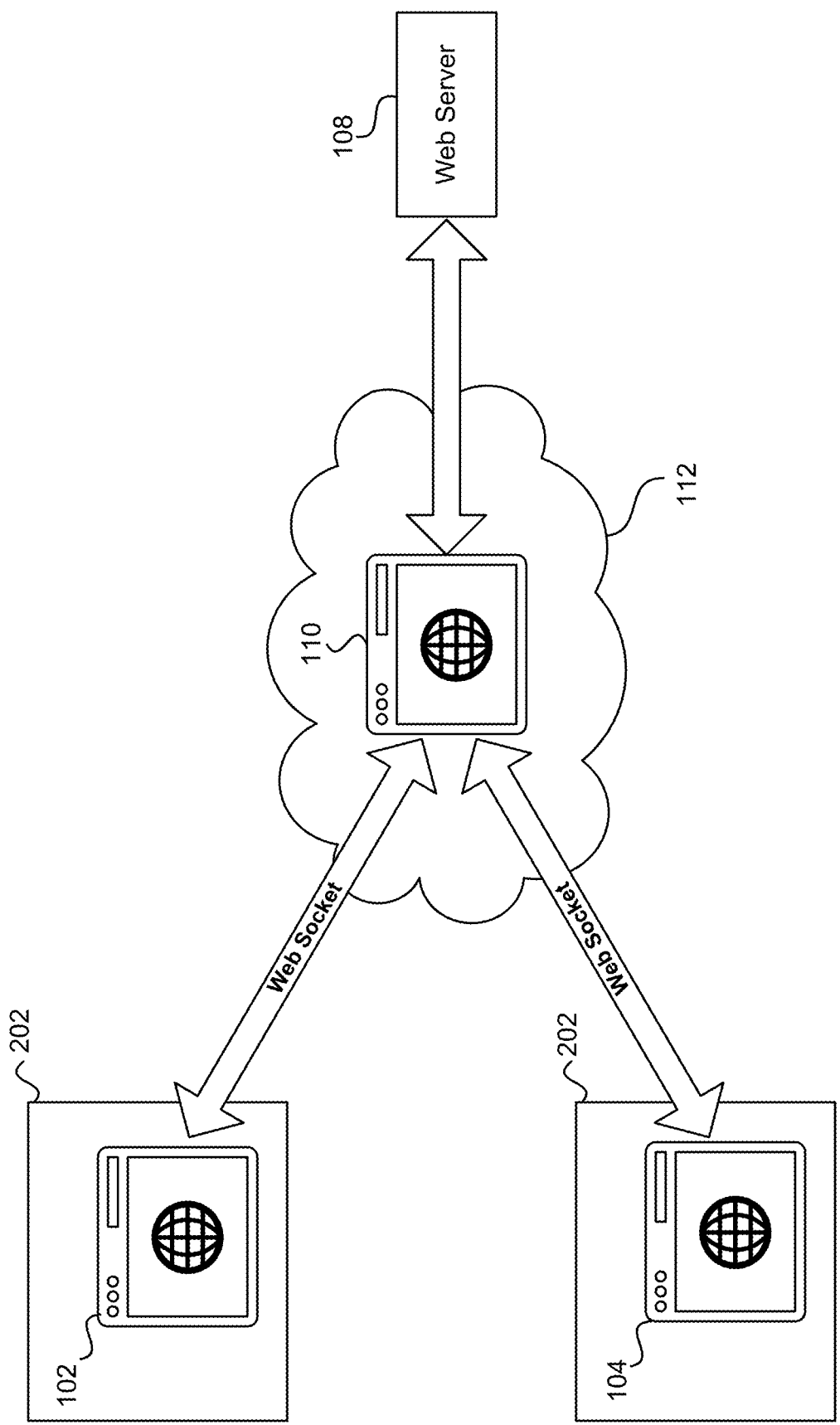
FIG. 1A is a diagram illustrating an example of a system for providing a remote host web browser service in accordance with the present disclosure.

For purposes of reading the description of the various embodiments below, the following descriptions of the sections of the specification and their respective contents may be helpful:

Section A provides an introduction to example embodiments of systems for providing a remote host browser service;

Section B describes examples of a network environment and computing environment which may be useful for practicing embodiments described herein;

Section C describes example embodiments of systems and methods for delivering shared resources using a cloud computing environment;

Section D describes example embodiments of systems and methods for managing and streamlining access by clients to a variety of resources;

Section E provides a detailed description of example embodiments of systems for providing a remote host browser service; and Section F describes example implementations of methods, systems, and computer-readable media in accordance with the present disclosure.

A. Introduction to Illustrative Embodiments of a System for a Remote Host Browser Service The inventors have recognized and appreciated that a user may be interested in continuing access to a web page when the user switches from one web browser to another. For example, a user may be interacting with or viewing a web page on a first web browser, for example, on the user's desktop computer, and may want to continue interacting with or viewing the web page on a second web browser, for example, the user's mobile device. Some embodiments of the present disclosure enable the user to seamlessly "switch" from one web browser to another without losing context for the web page with which the user is interacting. Some embodiments, moreover, allow such browser "switching" to be achieved in a secure fashion, e.g., by maintaining any associated security policies. Some embodiments of the present disclosure also enable users to share and/or collaborate with other users who are interacting with and/or viewing the same web page.

The present disclosure relates to a system where a remote host browser service may communicate with a web server hosting a web page and may be in charge of building and updating a document object model (DOM) corresponding to the contents of the web page, while a local endpoint device needs only to render the contents of the web page using the DOM data provided by the host browser service. The local endpoint device may send any local user input, such as mouse clicks, keyboard inputs, etc., to the host browser service, which may handle the user inputs, modify the DOM as needed, and send the changes to the DOM to the local endpoint device for rendering the web page for a user. Since the host browser service communicates with the web server and handles the DOM updates, some embodiments may enable a user to switch endpoint devices and/or web browsers and resume access to the web page. Some embodiments may additionally or alternatively enable collaboration between multiple endpoint devices and multi-casting to multiple endpoint devices. Further, some embodiments may additionally or alternatively support adding of security policies and/or filtering policies that define what content is displayed for a user based on certain conditions being met.

Conventional systems that offer remote browsing services typically launch an instance of remote browser for each device/user browser requesting access to a web page. By contrast, in at least some embodiments, the system disclosed herein uses the same instance of a host browser (by maintaining the DOM at the host browser) to provide multiple endpoint devices/user browsers access to a web page. Thus, some embodiments of the present system enable real-time changes and interactions with a web page to be displayed at multiple devices/user browsers.

A user may log on to use the remote host browser service via an endpoint device (also referred to herein as a client device). After logging in or signing in to the host browser service, the user may launch a web browser (referred to herein as a "user web browser") on the endpoint device, and may request to access one or more web pages (or a website) by entering a uniform resource locator (URL) associated with the web page in the user web browser. The request to access the web page may be sent to the host browser service, which may retrieve the contents of the web page by requesting them from a web server that hosts the web page. The host browser service may generate a document object model (DOM) using the contents of the web page, and may send the DOM to the endpoint device so that the user web browser can display the contents of the requested web page. Any input, such as mouse clicks, keyboard strokes, or other types of input, received at the endpoint device via the user web browser may be sent to the host browser service, which may modify the DOM accordingly.

Figure 1B:
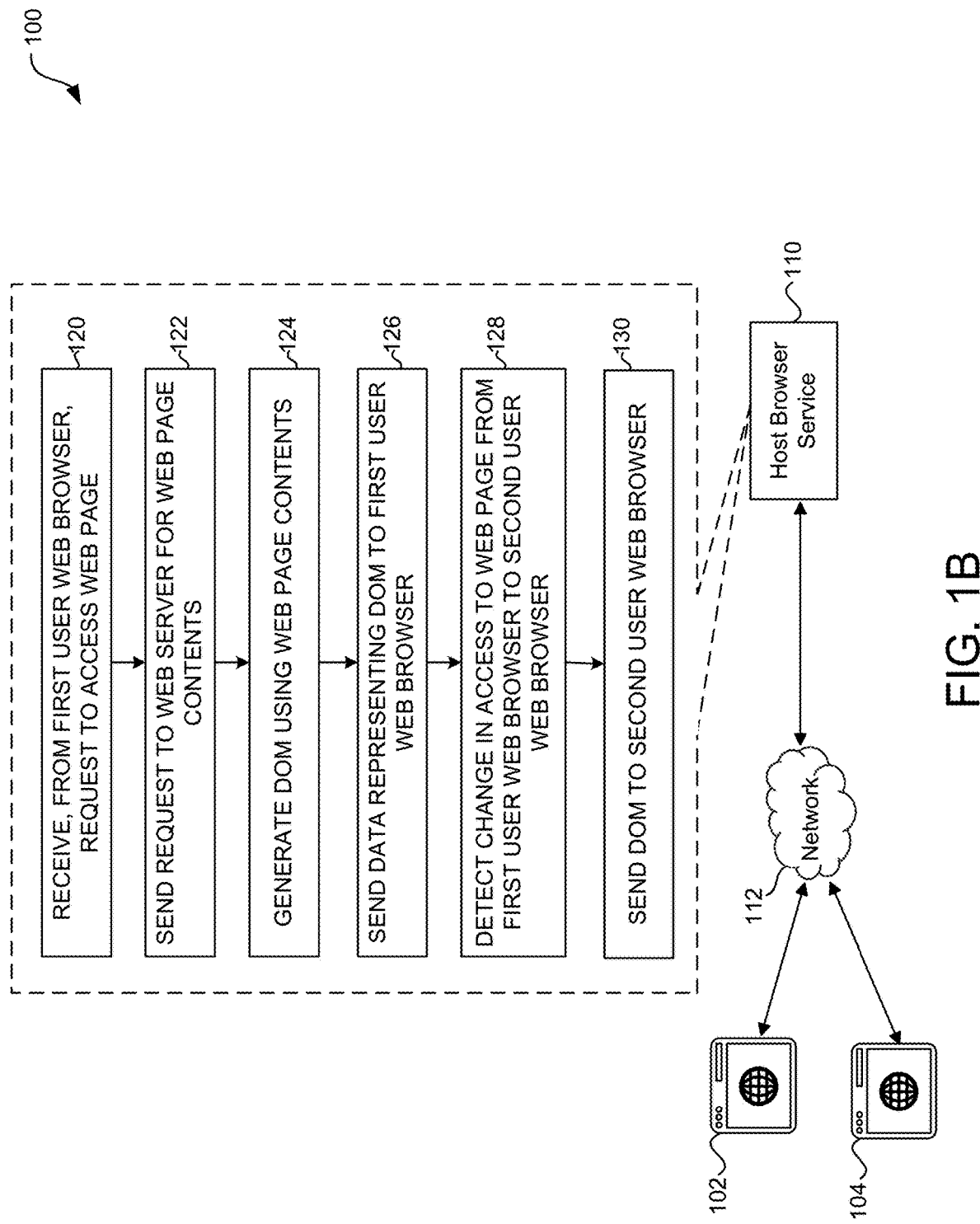
FIG. 1B is a diagram illustrating examples of features of the system shown in FIG. 1A in accordance with the present disclosure.

FIGS. 1A and 1B are diagrams illustrating certain features of an example system for providing a remote host web browser service in accordance with the present disclosure. As shown in FIG. 1A, the system may include a first user web browser 102 accessed via a client 202 (e.g., client 202(1) of FIG. 2A) and a second user web browser 104 accessed via the same client 202 (e.g., client 202(1) of FIG. 2A) or a different client 202 (e.g., client 202(2) of FIG. 2A). The user web browsers 102, 104 may, for example, be applications installed on the client(s) 202. The system may also include a host browser service 110 that may be in communication with the first user web browser 102 and the second user web browser 104 via a network 112. The network 112 may, for example, include the Internet and/or one or more other networks in addition to or in lieu of the Internet. In some embodiments, the host browser service 110 may include one or more of the components described below in connection with FIG. 5. In the illustrative example shown, the user web browsers 102, 104 are connected to the host browser service 110 using web sockets. The host browser service 110 may, for example, send hypertext transfer protocol (HTTP) requests to a web server 108 hosting one or more web pages.

In some implementations, a user may launch the first user web browser 102 on a client device 202 to access a web page, and then, at a later time, may switch user web browsers and launch the second user web browser 104 on the same client device 202 to continue working with the web page where the user left off. In other implementations, a user may launch the first user web browser 102 on a first client device 202 to access a web page, and then, at a later time, may switch devices and launch the second user web browser 104 on a second client device 202 to continue working with the web page. In yet other implementations, a first user may launch the first user web browser 102 on a first client device 202 to access a web page, and, at the same time or at a later time, a second user may launch the second user web browser 104 on a second client device 202 to access the web page. The second user, in such a scenario, may be able to see changes/user input entered by the first user via the first user web browser 102, thus enabling collaboration between the two users with respect to the same web page.

FIG. 1B illustrates examples of operations that may be performed by the host browser service 110 in some embodiments. As shown, the host browser service 110 may receive (120), from a first user web browser 102, a request to access one or more web pages using the host browser service 110. The host browser service 110 may, for example, assign a session identifier to the interaction between the first user web browser 102 and the host browser service 110. The host browser service 110 may send (122) a request to the web server 108 for the contents of the requested web page(s). The host browser service 110 may generate (124) a DOM using the web page contents, and may send (126) data representing the DOM to the first user web browser 102 to enable the first user web browser 102 to display the contents of the requested web page.

The host browser service 110 may detect (128) a change in access to the web page from the first user web browser 102 to a second user web browser 104. For example, the second user web browser 104 may request access to the web page via the host browser service 110 using the same session identifier associated with the interaction between the first user web browser 102 and the host browser service 110. The host browser service 110 may, for example, determine the DOM associated with the session identifier and may send (130) data representing the DOM to the second user web browser 104 to enable the second user web browser 104 to display the contents of the web page. In this manner, a user may switch from one user web browser to another while continuing access to the web page.

In some embodiments, the host browser service 110 may receive, from the first user web browser 102, user input with respect to the web page. The host browser service 110 may then modify the DOM to represent the changes caused by the user input to the web page, and may send data representing modifications to the DOM to the first user web browser 102. The user input may be received, for example, prior to the user switching user web browsers (e.g., operation 128). When the host browser service 110 detects a change in the access to web page via the second user web browser 104, the host browser service may send data representing the modified DOM to the second user web browser 104 to enable it to replicate the changes to the web page contents as modified by the user input provided by the user previously via the first user web browser 102. In this manner, the user can switch from one user web browser to another without losing the work or input provided by the user via the first user web browser 102.

In some embodiments, the host browser service 110 may receive a security level associated with an element (e.g., a window, a frame, a table, a button, an image, or other html element) of the requested web page. The host browser service 110 may, for example, send data to the user web browser 102 in accordance with the security level. For example, the security level may specify a browser type, and the particular user web browser 102 may not match the specified browser type. In some embodiments, the security level may further indicate how information corresponding to the element should be sent to the user web browser 102 when it does not satisfy the browser type condition. In some implementations, for example, the security level may indicate that the host browser service 110 may send only size information for the element when the browser-type condition is not satisfied, thus causing the user web browser 102 to display a blank area of the same size as the element instead of the contents corresponding to the element. As another example, the security level may indicate that, when the security level condition is not met, the host browser service 110 is to send an image of the contents corresponding to the element rather than actual contents, thus causing the user web browser 102 to display the image instead of the actual content of the web page. By displaying only an image, the user may be unable to interact with the web page contents but still be able to see them.

Although the illustrated example shows two user web browsers 102 and 104, it should be understood that more than two user web browsers may engage in a session with the host browser service 110 at the same time to access web pages in the same manner as another user web browser.

Additional details and example implementations of embodiments of the present disclosure are set forth below in Section E, following a description of example systems and network environments in or with which such embodiments may be deployed.

B. Network and Computing Environment

Figure 2A:
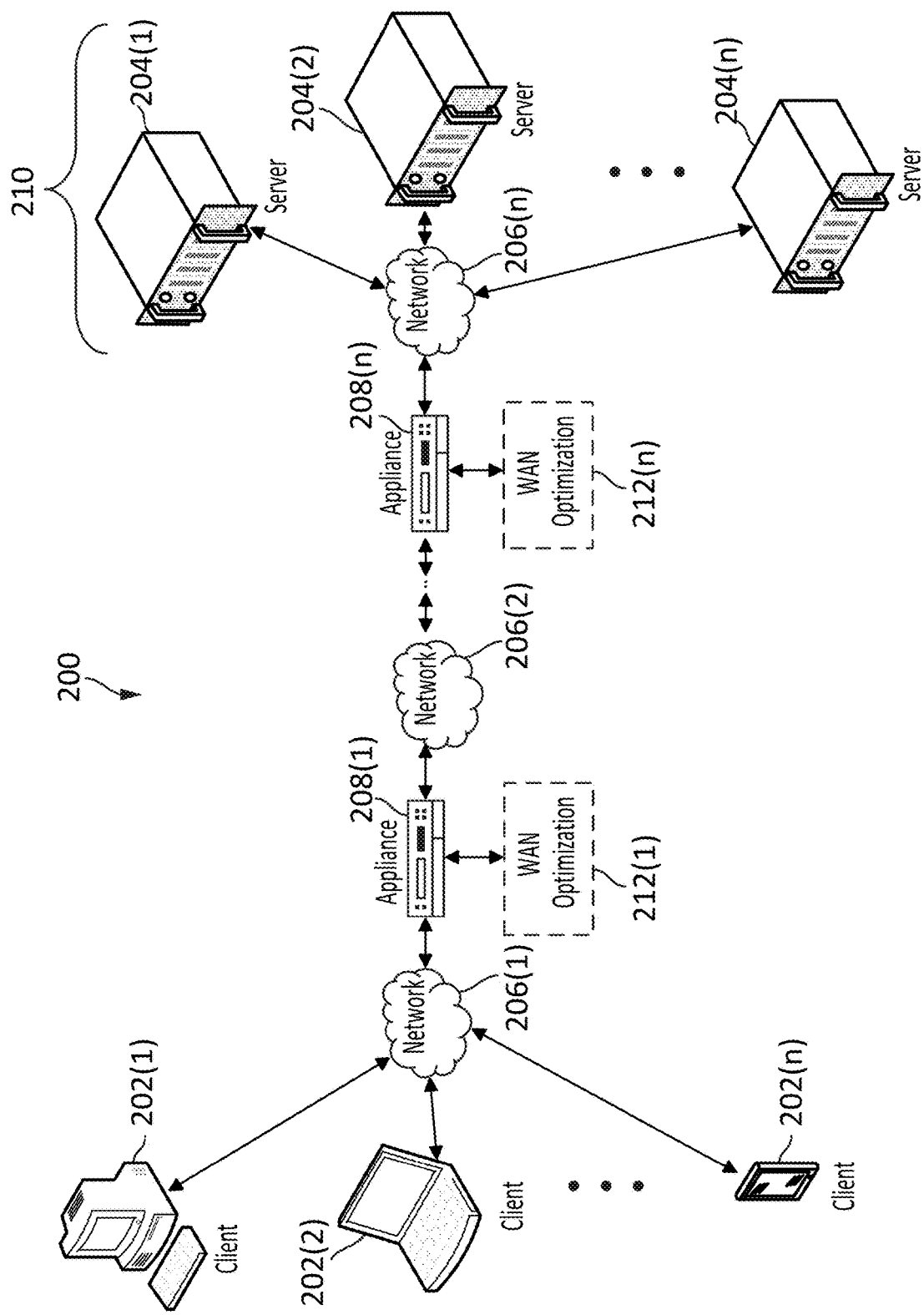
FIG. 2A is a diagram of an example network computing environment in which some embodiments of the remote host web browser service disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208).

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as an application server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
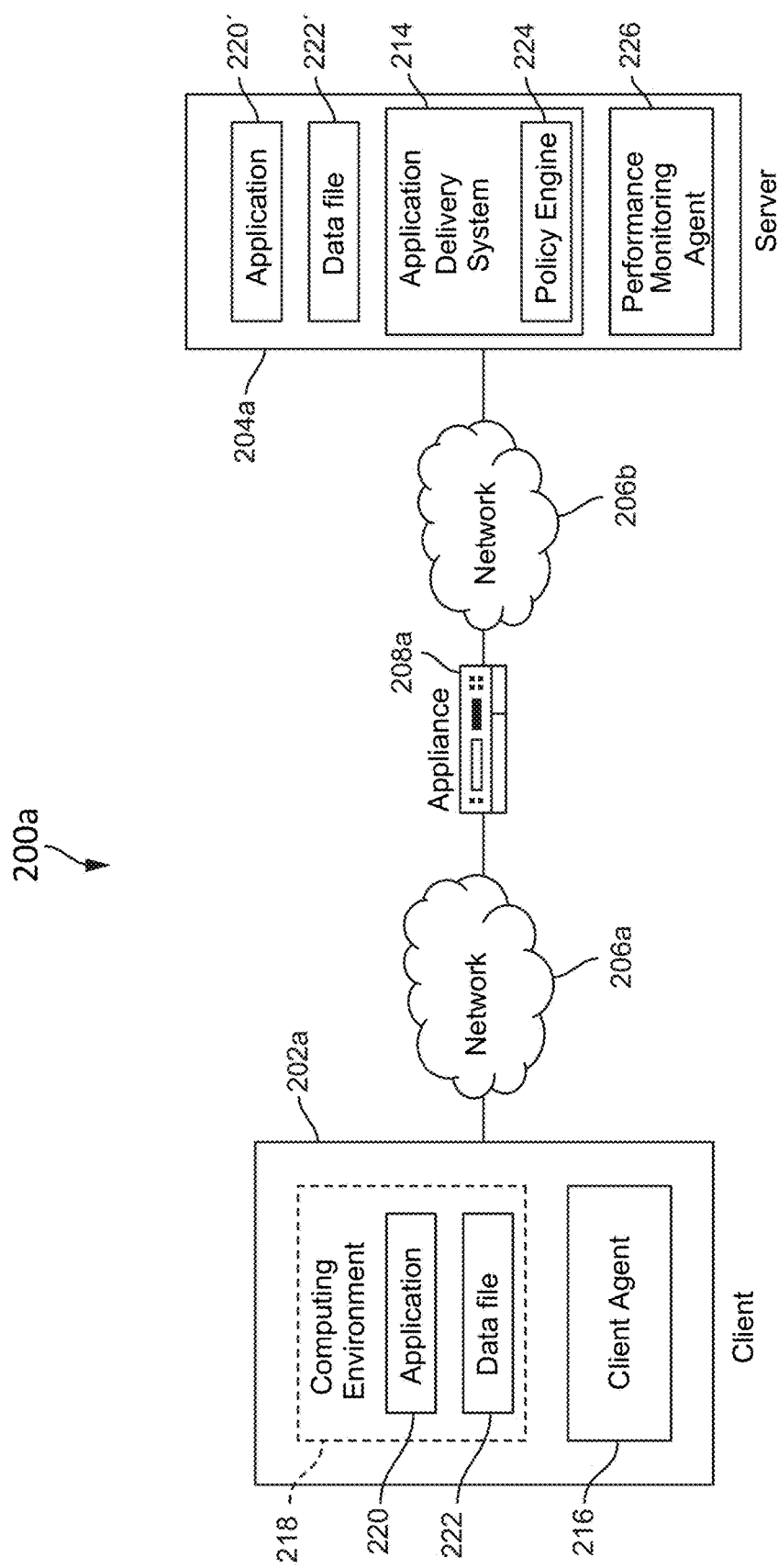
FIG. 2B is a diagram illustrating how a network computing environment like that shown in FIG. 2A may be configured to deliver a computing environment from a server to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202a may, for example, have installed and/or execute one or more applications that are in communication with the network 206a. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204a to the client 202a. The client agent 216 may also perform endpoint detection/scanning and/or collect endpoint information about the client 202a for the appliance 208a and/or the server 204a. The appliance 208a and/or the server 204a may use the collected information to determine and provide access, authentication, and/or authorization control of the client's connection to the network 206a. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208a and/or the server 204a.

The appliance 208a may accelerate delivery of all or a portion of the computing environment 218 to the client 202a, for example by the application delivery system 214. For example, the appliance 208a may accelerate delivery of a streaming application 220' and data file 222' processable by the application 220 from a data center to a remote user location by accelerating transport layer traffic between the client 202a and the server 204a. Such acceleration may be provided by one or more techniques, such as: 1) transport layer connection pooling, 2) transport layer connection multiplexing, 3) transport control protocol buffering, 4) compression, 5) caching, or other techniques. The appliance 208a may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202a), remote or otherwise, based on authentication and authorization policies applied by a policy engine 224. A remote user may obtain a computing environment and access to server stored applications 220' and data files 222' from any network-connected device (e.g., the client 202a). For example, the appliance 208a may request an application 220' and data file 222' from the server 204a. In response to the request, the application delivery system 214 and/or the server 204a may deliver the application 220' and data file 222' to the client 202a, for example via an application stream to operate in the computing environment 218 on client the 202a, or via a remote-display protocol or otherwise via remote-based or server-based computing. In an embodiment, application delivery system 214 may be implemented as any portion of the Citrix Workspace™ and Citrix Virtual Apps and Desktops™ by Citrix Systems, Inc., of Fort Lauderdale, Fla.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution.

For example, in operation, the client 202a may request execution of an application (e.g., application 220') and the application delivery system 214 of the server 204a may determine how to execute the application 220', for example based upon credentials received from the client 202a and a user policy applied by the policy engine 224 associated with the credentials. For example, the application delivery system 214 may enable the client 202a to receive application-output data generated by execution of the application on the server 204a, may enable client the 202a to execute the application 220 locally after receiving the application from the server 204a, or may stream the application via one or more networks 206a, 206b to the client 202a. For example, in some embodiments, the application 220 may be a server-based or a remote-based application executed on the server 204a on behalf of the client 202a. The server 204a may display output to the client 202a using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, Fla.

The monitoring agents may, for example, monitor, measure, collect, and/or analyze data on a predetermined frequency, based upon an occurrence of given event(s), or in real time during operation of the network environment 200a. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computing system, a plurality of computing systems, or a network of distributed computing systems such as computing system 246 shown in FIG. 2C.

Figure 2C:
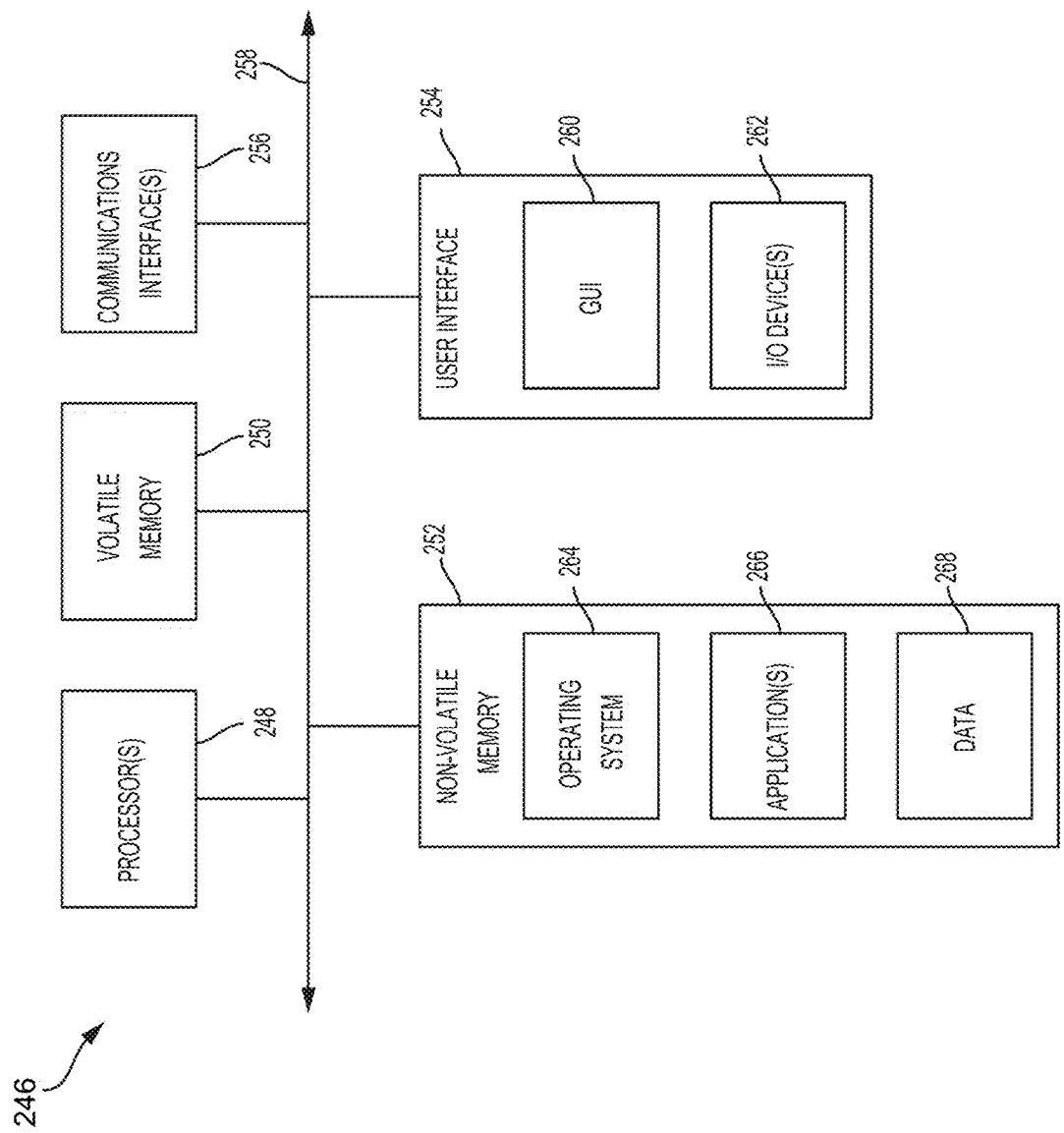
FIG. 2C is a block diagram of an example of a computing system that may be used to implement one or more of the components of the computing environment shown in FIGS. 2A-B.

As shown in FIG. 2C, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication the bus 258. The computing system 246 as shown in FIG. 2C is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a LAN, a WAN, or the Internet through a variety of wired and/or wireless or cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 3:
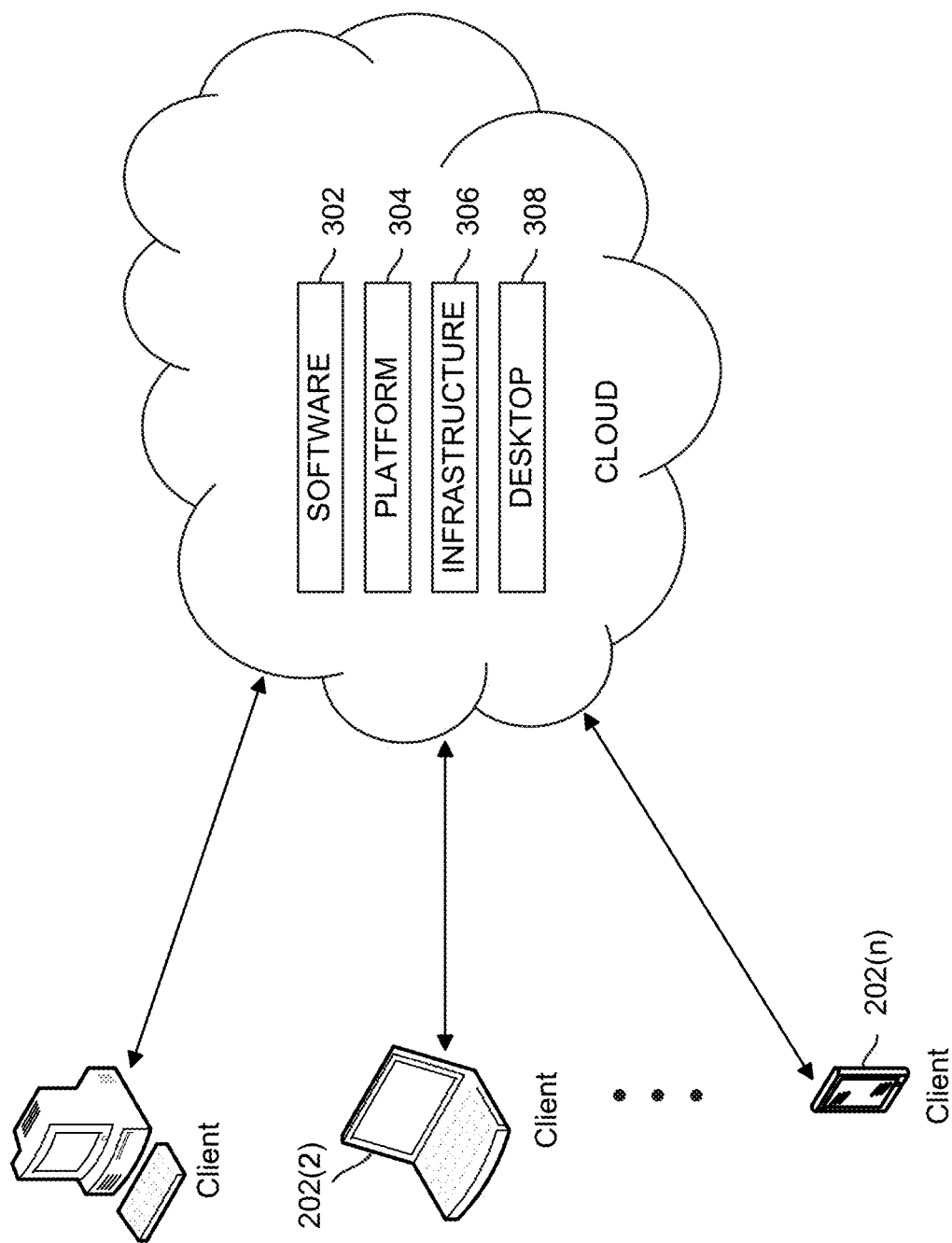
FIG. 3 is a schematic block diagram of an example of a cloud computing environment in which various aspects of the disclosure may be implemented.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 4A:
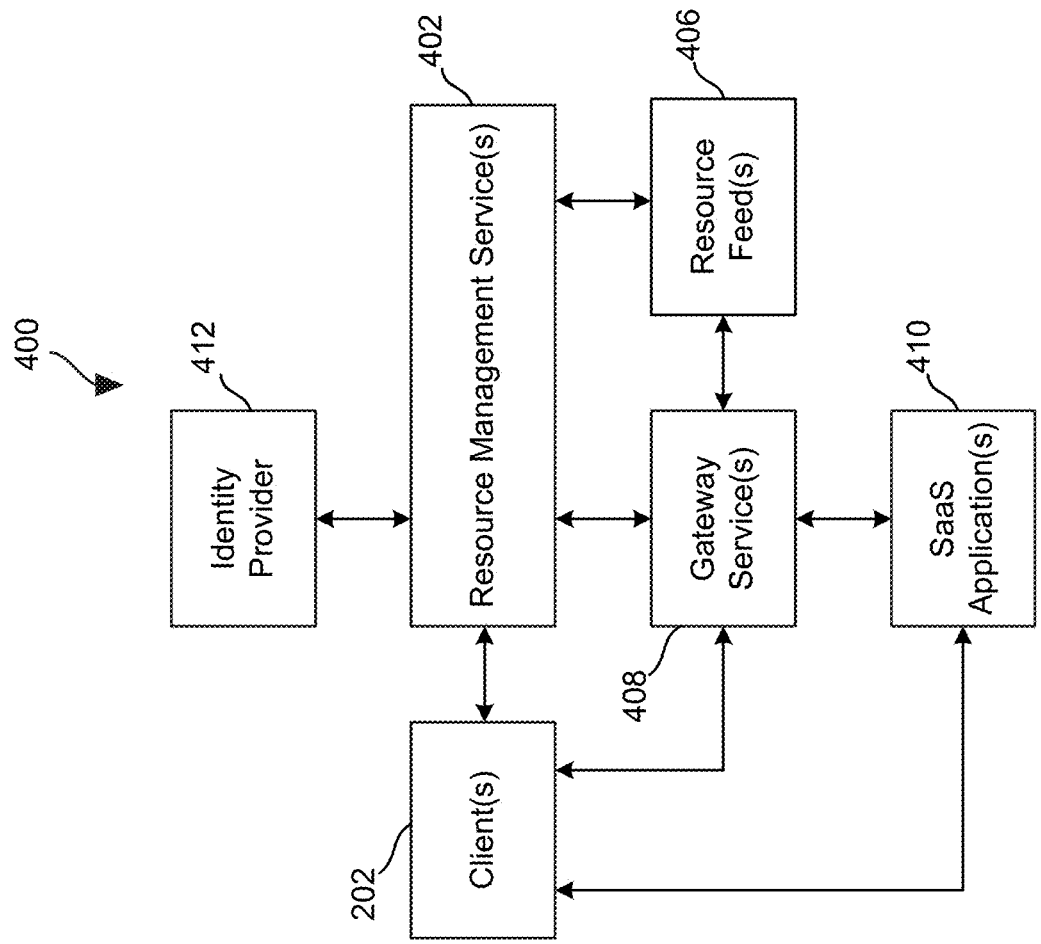
FIG. 4A is a block diagram of an example system in which resource management services may manage and streamline access by clients to resource feeds (via one or more gateway services) and/or software-as-a-service (SaaS) applications.

D. Systems and Methods for Managing and Streamlining Access by Client Devices to a Variety of Resources FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
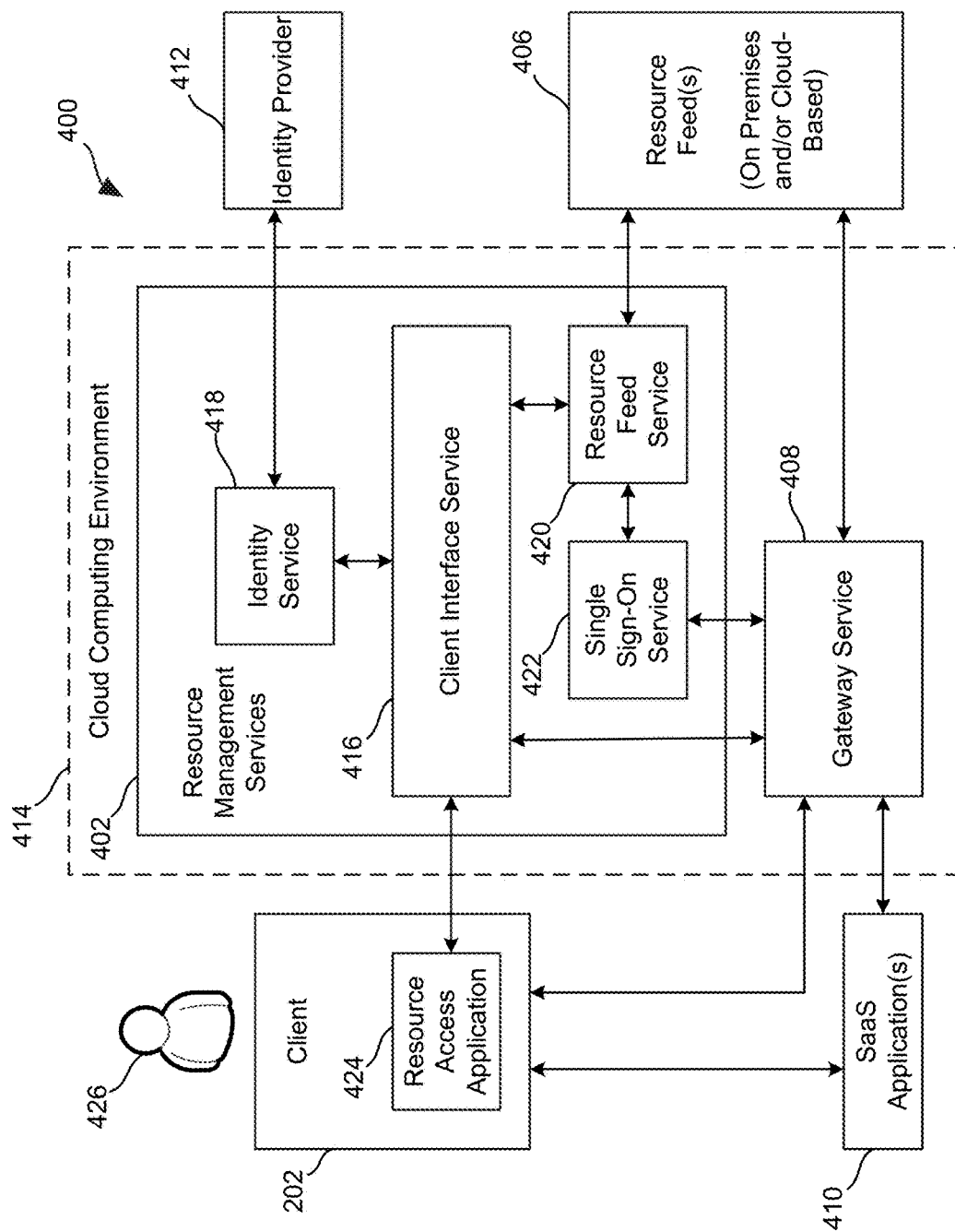
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
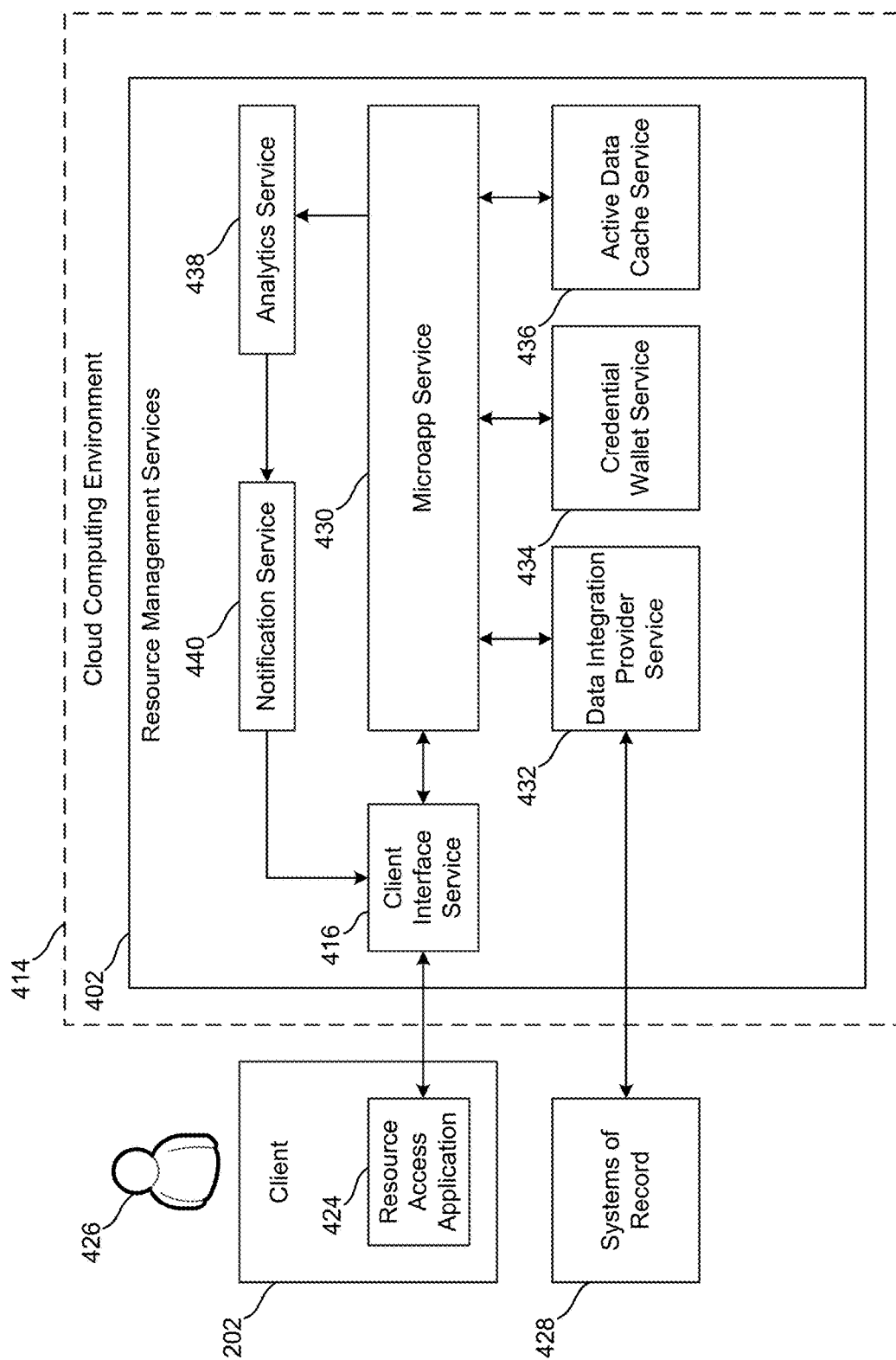
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 430 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information they are looking for.

E. Detailed Description of Example Embodiments of System for Remote Host Browser Service The present disclosure describes a system where a local user browser on an endpoint device may be responsible for rendering the contents of a web page, while a host web browser service may handle communication with the web server hosting the web page, e.g., HTML/CSS parsing, execution of JavaScript, building and maintaining of the DOM, and other operations. The local user web browser may send any user input with respect to the web page to the host browser service, and the host browser service may send any resulting DOM changes to the local user web browser. This functionality may enable a user to resume the user's task or workflow when switching to another device or user web browser. It may also enable enforcement of security policies via the host browser service.

Figure 5:
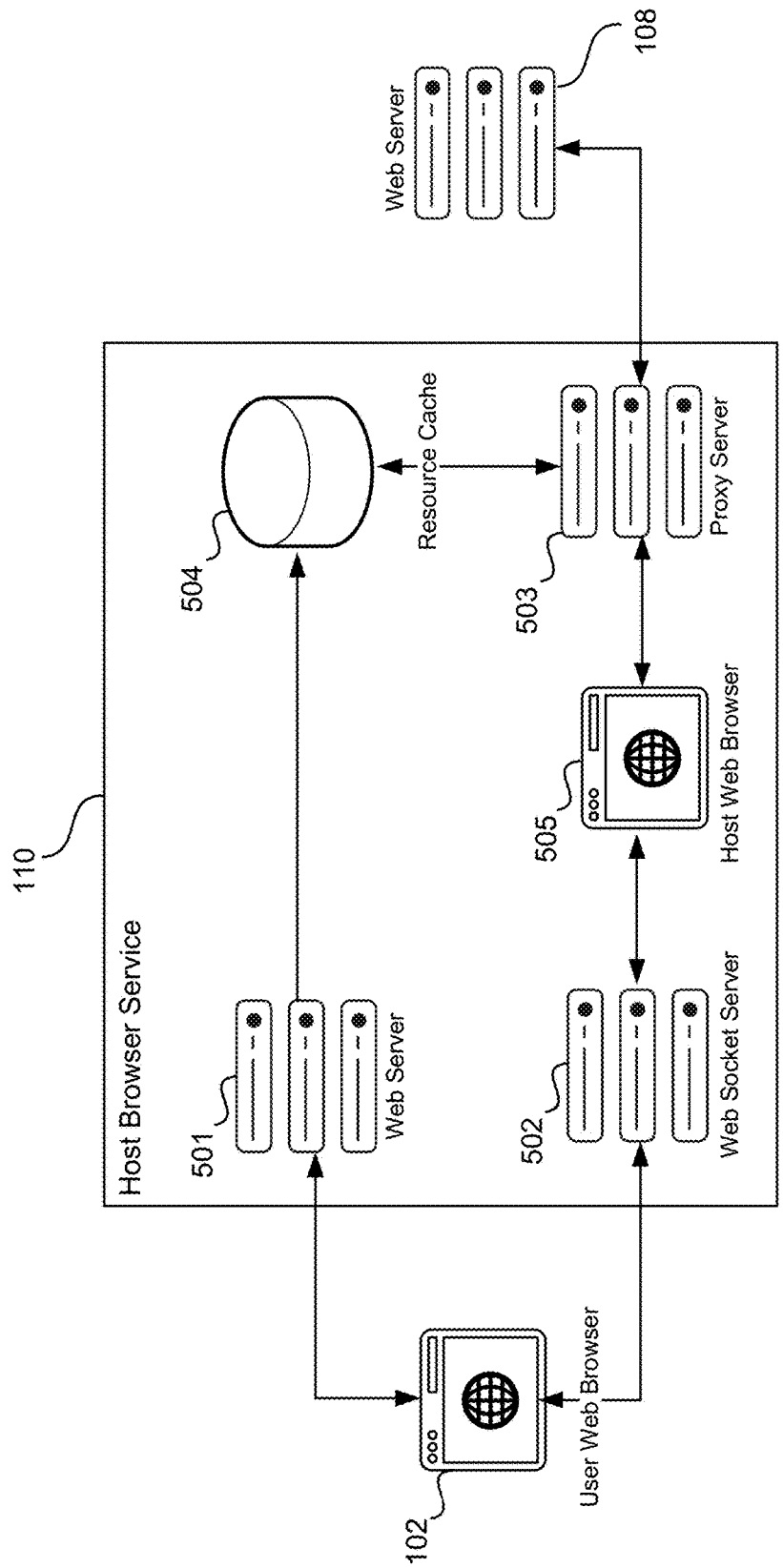
FIG. 5 is a diagram illustrating components of an example of a remote host web browser service in accordance with the present disclosure.

FIG. 5 is a diagram illustrating example components of a host browser service 110 in accordance with the present disclosure. The host browser service 110 may, for example, be a cloud computing service, such as the SaaS 302 shown in FIG. 3. As shown, in some embodiments, the host browser service 110 may include a web server 501, a web socket server 502, a proxy server 503, a resource cache 504, and a host web browser 505. With the illustrated system, a request from the user web browser 102 to access a web page may be routed through the host browser service 110 to the web server 108 hosting the requested web page, and the host browser service 110 may provide data to the user web browser 102 to enable it to display the web page. As illustrated, the host browser service 110 may communicate with both the user web browser 102 and the web server 108 that hosts the web pages requested by the user web browser 102.

The web server 501 may, for example, be configured to manage and process network requests, HTTP requests, or other type of requests from the user web browser 102. For example, the web server 501 may receive and process a request from the user web browser 102 to launch the host browser service 110 and activate a connection between the user web browser 102 and the host browser 505. The web server 501 may send a script (e.g., script 153 of FIG. 7) to the user web browser 102, which may use the script to set up a web socket connection between the user web browser 102 and the host browser service 110. After the connection is established, further communications between the user web browser 102 and the host browser service 110 are routed through the web socket server 502, with the exception of static resources, which may be provided by the resource cache 540. A user may, for example, request to launch the host browser service 110 to access one or more web pages and be able to have persistent access to the web pages via different user web browsers and/or endpoint devices.

The web socket server 502 may be configured to provide web socket service(s) for the user web browser 102 and the host web browser 505, thus enabling them to communicate with one another via messages and/or send data to one another. The web socket server 502 may provide a socket connection between the user web browser 102 and the host browser service 110 to enable a persistent connection with the endpoint device 202 (where the user web browser 102 is launched).

The proxy server 503 may be configured to act as intermediary for routing requests from the host web browser 505 to the web server 108 and routing data from the web server 108 to the host web browser 505. For example, the host web browser 505 may request contents of the web page requested by the user web browser 102, and the web server 108 may provide data representing the contents of the requested web page to the host web browser 505 via the proxy server 503. The proxy server 503 may also be configured to overwrite a portion of the data representing the contents of the requested web page, for example, inject scripts into the original web page contents so that the host web browser 505 can establish a connection to the web socket server 502. The web socket connection may be between a web page at a web browser and the web socket server 502, therefore, additional scripts may be inserted or injected into the web page to allow the host browser service 110 to detect changes to the web page contents.

The resource cache 504 may be a database configured to cache/store data and/or resources relating to web pages (that may have been previously requested by the user or are requested by the user during the instant session). The resource cache 504 may store data/resources needed by the host browser service 110 to provide services to the user web browser 102. In some cases, certain resources are only available or can only be fetched after providing some credentials or login information. In these cases, the user web browser 102 cannot fetch such resources from the web server 108 since the web browsing session is established via the host browser 505. In these cases, the resources are cached in the resource cache 504 so they can be fetched to provide to the user web browser 102.

The host web browser 505 may, for example, be a software application implemented by the host browser service 110 for accessing web pages and other data on the World Wide Web. The host browser service 110 may use the host web browser 505 to access the web pages hosted by the web server 108 and requested by the user web browser 102.

The user web browser 102 may be a software application (e.g., included in the application(s) 266 of a computing system 246, such as that shown in FIG. 2C, of a client 202) used for accessing web pages and other data on the World Wide Web. The user web browser 102 may display the contents of the web page using data representing the DOM provided by the host browser service 110. Examples of user web browser applications may include, but are not limited to, embedded web browsers (such as ones provided by Citrix Workspace™), secure web browsers (such as ones provided by Citrix Cloud™), virtual web browsers, locally-installed device web browsers, secure web browsers on mobile computing device, and the like. Examples of user web browser applications may also include, but are not limited to, Internet Explorer, Mozilla Firefox, Google Chrome, Safari, Microsoft Edge, and the like.

Figure 6A:
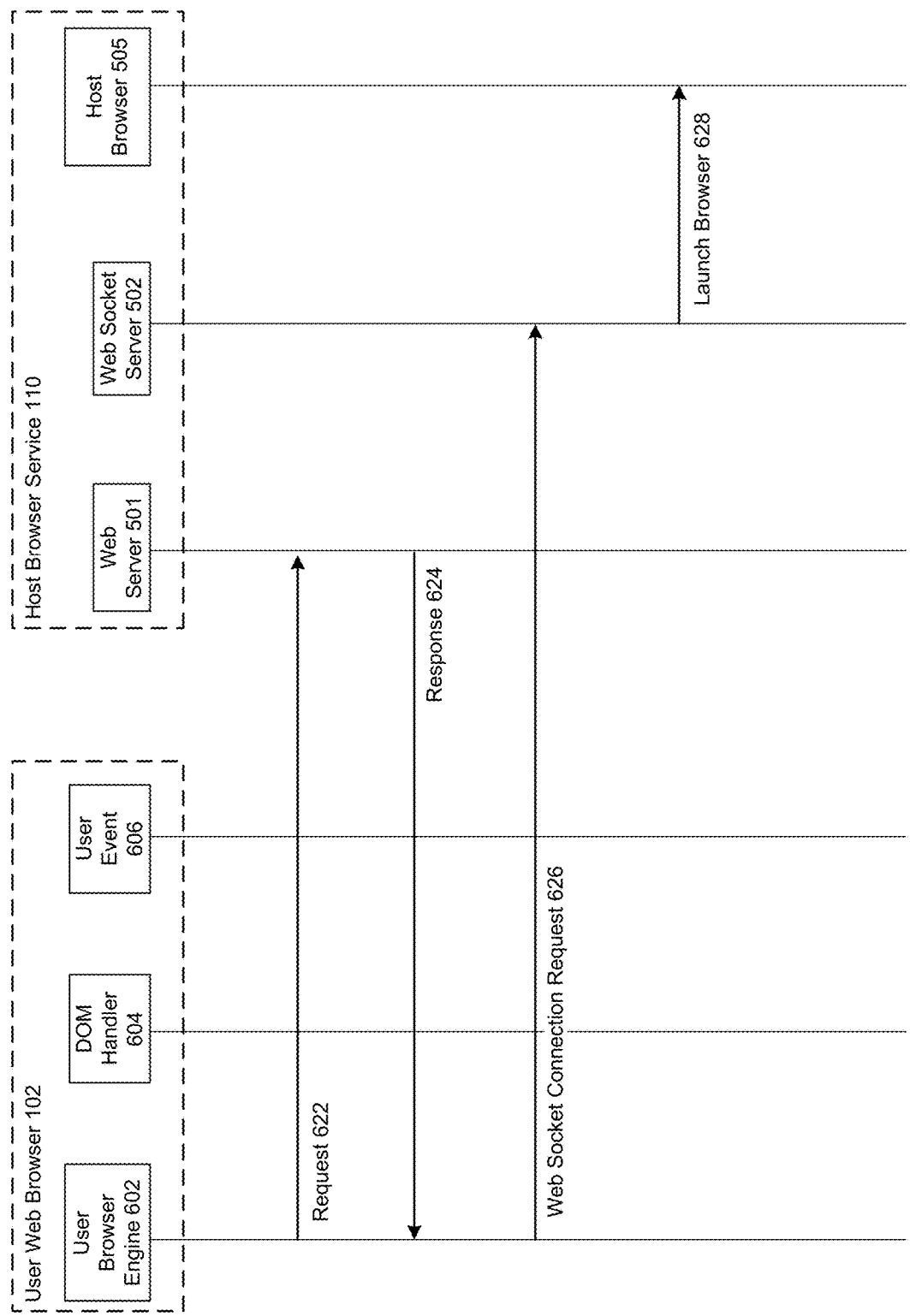
FIG. 6A illustrates an example signal flow between a user web browser and the host browser service in accordance with the present disclosure.

FIG. 6A illustrates an example signal flow for when a user requests to launch the host browser service 110 for accessing web pages. As shown, the user web browser 102 may include one or more components, such as a user browser engine 602, a DOM handler component 604, and a user event component 606. The host browser service 110 may include, as described above, the web server 501, the web socket server 502, and the host browser 505. A host browser engine may be included as part of the host browser 505. Such a host browser engine may be configured, for example, to transform HTML documents and other resources of a web page into a visual representation that may be displayed on a client device and that a user can interact with.

To launch the host browser service 110, a user may open/launch the user web browser 102 on the user's client device 202 and enter or select a URL to access the host browser service 110. In other implementations, the client device 202 may include an application corresponding to the host browser service 110, and the user may open/launch the host browser application. As illustrated in FIG. 6A, either action may cause the user web browser 102 to send (622) a request to the web server 501 to launch a host web browser 505 instance. The request may be an HTTP request, an HTTPS request, or other protocol request. The user web browser 102 may, for example, be set as the default web browser for the client device 202 by the user, or the user web browser 102 may be open/active on the client device 202 when the user requests to launch the host browser service 110. In some implementations, the host browser service 110 may display a dialog box on the client device 202 asking the user which web browser the user would prefer to use.

The web server 501 may send (624) a response to the user web browser engine 602, and the user web browser engine 602 may, in response, send (626) a web socket connection request to the web socket server 502. The response sent by the web server 501 may be an HTTP response, an HTTPS response, or other protocol response. The web socket server 502 may send (628) a request to launch the host browser 505. The host browser service 110 may, for example, create/generate/establish a session identifier to identify the instant session between the user web browser 102/client device 202 and the host browser service 110. The host browser service 110 may associate such a session identifier with any requests from the user web browser 102, the DOM corresponding to the requested web pages, and/or other data relating to the session. The host browser service 110 may use the session identifier to identify the user/owner associated with a particular instance of the host web browser 505. Additionally, a user may share or provide access to another user to their instance of the host web browser 505 for collaboration purposes. For example, a first user may request to use the host browser service 110 to access web pages via a first instance of the host web browser 505, and the host web browser service 110 may identify this session using a first session identifier. A second user may request to use the host browser service 110 to access web pages via a second instance of the host web browser 505, and the host web browser service 110 may identify this session using a second session identifier. When the user switches web browsers and/or client devices, or when another user requests collaboration access, the host browser service 110 may use the session identifier to determine which DOM and web pages should be made available in response to such requests. For example, if the first user switches from a first user web browser to a second user web browser while using the host browser service 110, the service 110 may use the first session identifier to identify the most recent DOM stored at the first instance of the host web browser 505 and provide that DOM to the second user web browser, so that the first user may continue where he/she left off at the first user web browser. In some embodiments, the host browser service 110 may store a table or map associating session identifiers to instances of the host web browser 505.

The DOM handler 604 may be configured, for example, to generate a DOM using data provided by the host browser service 110 to enable the user web browser 102 to display contents of the requested web pages. The user event component 606 may, for example, be configured to detect user input (e.g., mouse clicks, keyboard strokes, etc.) at the user web browser 102 and send data relating to the user input to the host browser service 110. In some embodiments, components of the user web browser 102, such as the user browser engine 602, the DOM handler 604 and the user event component 606 may share the web socket connection established in step 626.

Figure 6B:
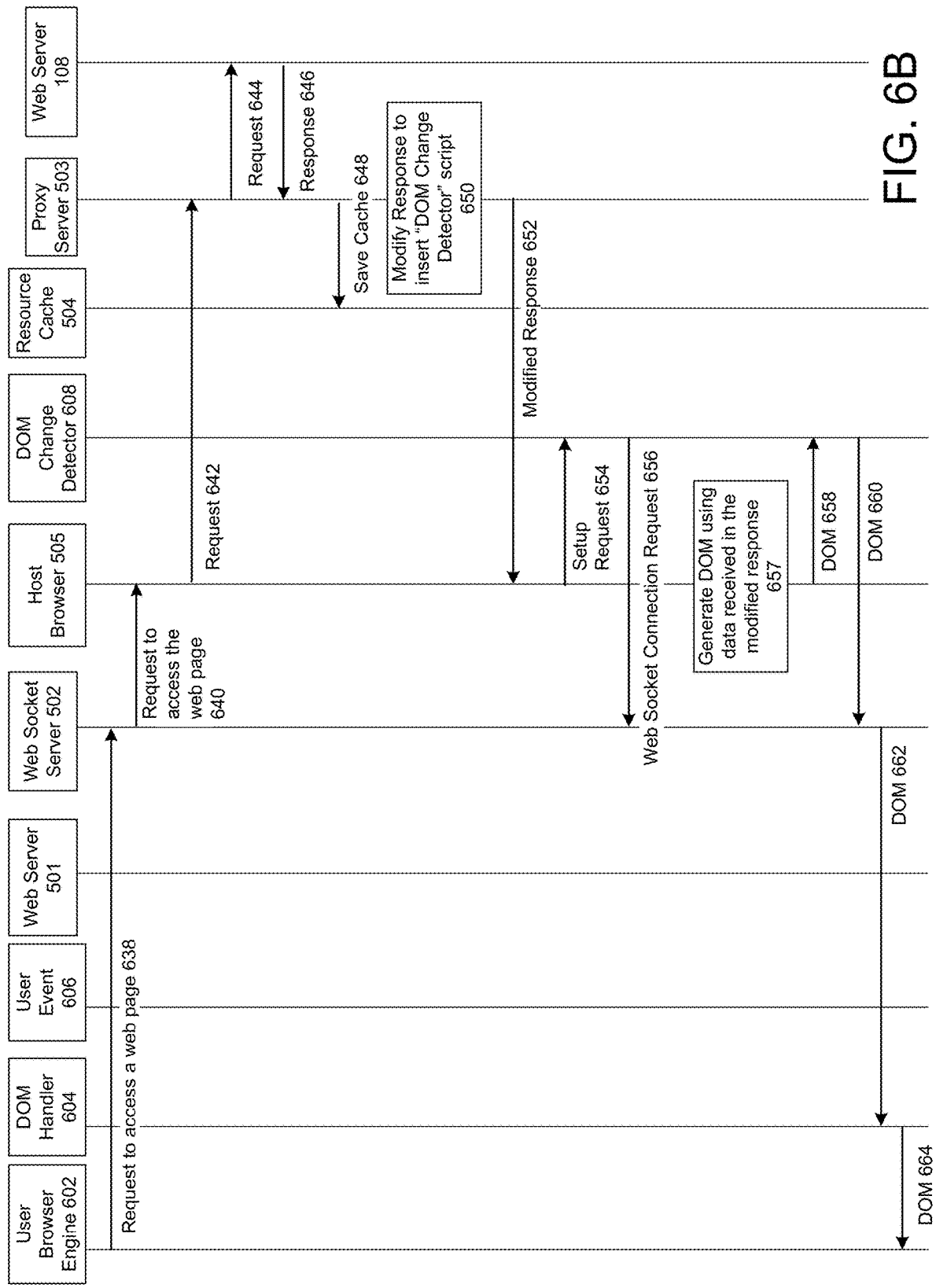
FIG. 6B illustrates an example of signal flow between a user web browser and the host browser service in accordance with the present disclosure.

FIG. 6B illustrates an example signal flow for when the user requests to access a web page after the host browser service 110 has been launched. As shown in FIGS. 5 and 6A, the host browser service 110 may include one or more components, such as the web server 501, the web socket server 502, the host web browser 505, the resource cache 504, and the proxy server 503. In some embodiments, the host browser service 110 may also include a DOM change detector 608 that may be configured to detect when the DOM corresponding to the contents of the web page is changed/modified due to user input. The DOM change detector 608, in some embodiments, may be a JavaScript object included in the host browser 505.

As shown in FIG. 6B, a user may enter or select a URL for a web page in the user web browser 102 at the client device 202. The user browser engine 602 may send (638) the request to access the web page to the web socket server 502. Such a request may, for example, include the URL for the web page. The web socket server 502 may send (640) the request to access the web page (including the URL) to the host browser 505. The host browser 505 may send (642) a request to the proxy server 503 to retrieve the contents of the web page (based on the URL). The proxy server 503 may send (644) the request to the web server 108 that hosts the web page identified by the URL, and the web server 108 may send (646) an response to the proxy server 503. The request and response may be an HTTP request/response, an HTTPS request/response, or other protocol request/response. Such a response may, for example, include data representing the contents of the web page. The proxy server 503 may send (648) data/resources associated with the web page to the resource cache 504 for storage.

The proxy server 503 may modify (650) the response from the web server 108 to insert code/script to detect changes in the DOM corresponding to the contents of the web page. The proxy server 503 may send (652) the modified response to the host browser 505. The script included in the modified response may cause the host browser 505 to determine that a user input caused a change in the DOM, and may then cause the host browser 505 to take appropriate action. The host browser 505 may, for example, send (654) a setup request to the DOM change detector 608, and the DOM change detector 608 may send (656) a web socket connection request to the web socket server 502.

The host browser 505 may generate (657) a DOM (e.g., original DOM or first DOM) using the contents of the web page sent via the response (operation 652). The host browser may send (658) data representing the original DOM to the DOM change detector 608 so that the DOM change detector 608 can detect changes to the original DOM. The DOM change detector 608 may store the data representing the original DOM. The DOM change detector 608 may send (660) data representing the original DOM to the web socket server 502, and the web socket server 502 may send (662) that data to the DOM handler 604 of the user web browser 102. The DOM handler 604 may send (664) the data representing the original DOM to the user browser engine 602. The DOM handler 604 may call DOM APIs provided by the browser engine 602. The user browser engine 602 may use that data to generate a mirror DOM to enable the user web browser 102 to display the contents of the web page.

Figure 6C:
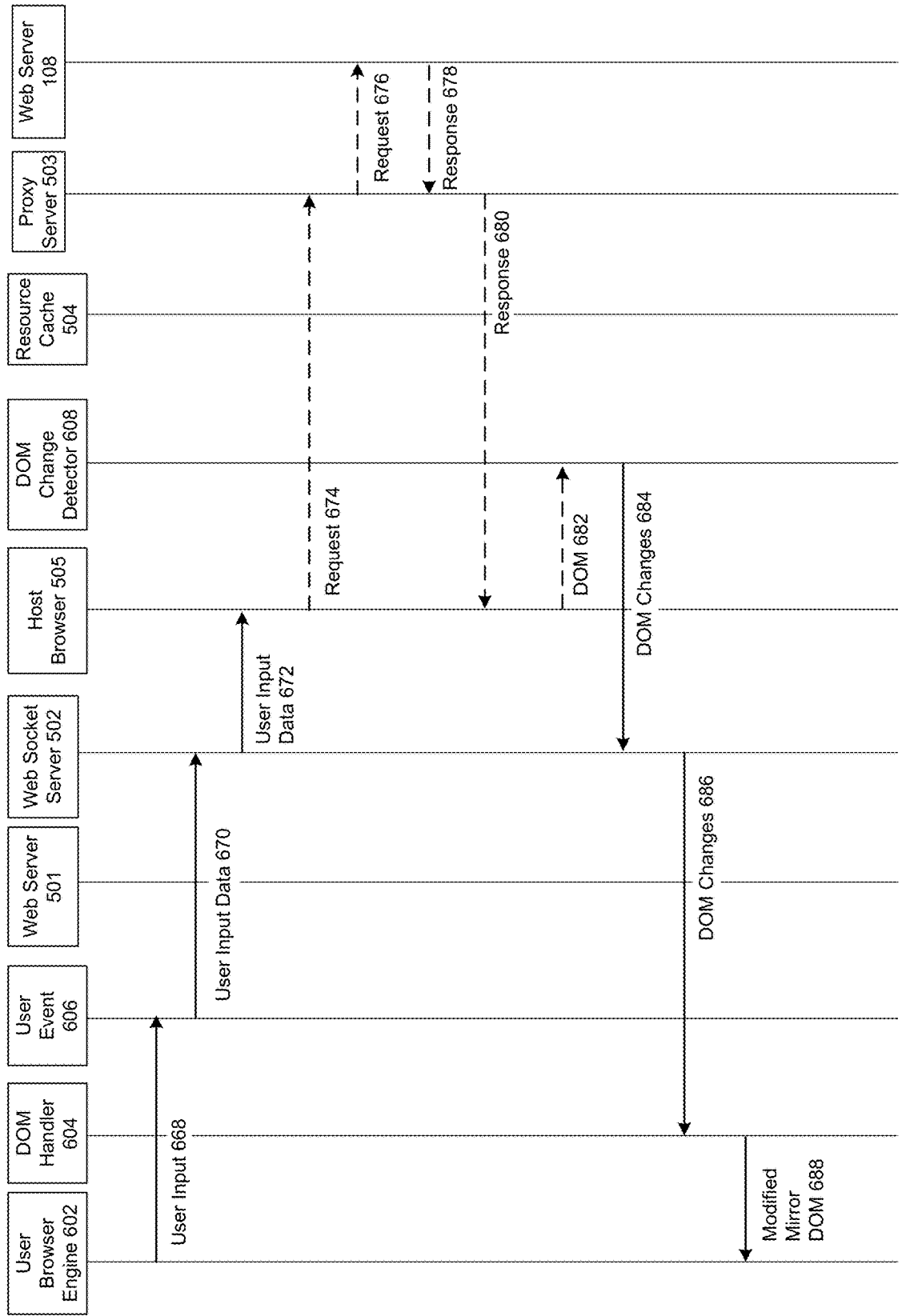
FIG. 6C illustrates an example of signal flow between a user web browser and the host browser service in accordance with the present disclosure.

FIG. 6C illustrates an example signal flow for when the user interacts with the web page and provides an input via the user web browser 102, which input causes changes to displayed contents of the web page that necessitate changes to the original DOM. For example, the user may interact with the web page by entering information, such as filling out a form, entering text in data fields, entering a term in a search field, etc. In other examples, the user may interact with the web page by clicking on displayed contents that may be linked to other web pages.

As shown in FIG. 6C, the user browser engine 602 may send (668) the user input to the user event component 606. The user event component 606 may process the user input and may send (670) data relating to the user input to the web socket server 502. The web socket server 502 may then send (672) the data relating to the user input to the host browser 505. The host browser 505 may send (674) a request to the proxy server 503 for contents of the web page as modified by the user input. The request may include data relating to the user input. The proxy server 503 may send (676) the request to the web server 108, and the web server 108 may send (678) a response including the contents of the web page as modified by the user input.

The proxy server 503 may send (680) the response from the web server 108 to the host browser 505. The host browser 505 may generate a DOM (e.g., modified/updated DOM or second DOM) using the contents of the web page represented in the response (as modified by the user input). The host browser service 110 may store the modified DOM and associate it with the session identifier. The host browser 505 may send (682) data representing the DOM to the DOM change detector 608. The DOM change detector 608 may detect changes to the original DOM based on the data received from the host browser 505.

In some embodiments, the steps 674, 676, 678, 680 and 682 may be optional. In some cases, the scripts running at the host browser 505 may be able to detect user input and modify the DOM without communication to the web server 108.

The DOM change detector 608 may send (684) data representing the changes to the original DOM to the web socket server 502. In some embodiments, the DOM change detector 608 may send data representing the modified DOM (rather than just the changes to the original DOM). The web socket server 502 may send (686) the data from the DOM change detector 608 to the DOM handler 604. The DOM handler 604 may generate a modified mirror DOM based on the received data, and may send (688) the modified mirror DOM to the user browser engine 602 to enable display of the web page contents (at the client device 202) as modified by the user input (received in operation 668).

In this manner, user input with respect to the web page displayed at the user web browser 102 may be routed through the host browser service 110 to the web server 108, and the host browser service 110 may store changes to the DOM caused by the user input. As described further below, storing the modified DOM at the host browser service 110 may enable the host browser service 110 to provide the modified DOM to other user web browsers, thus enabling the other user web browsers to display the contents of the web page as modified by the user input.

Figure 7:
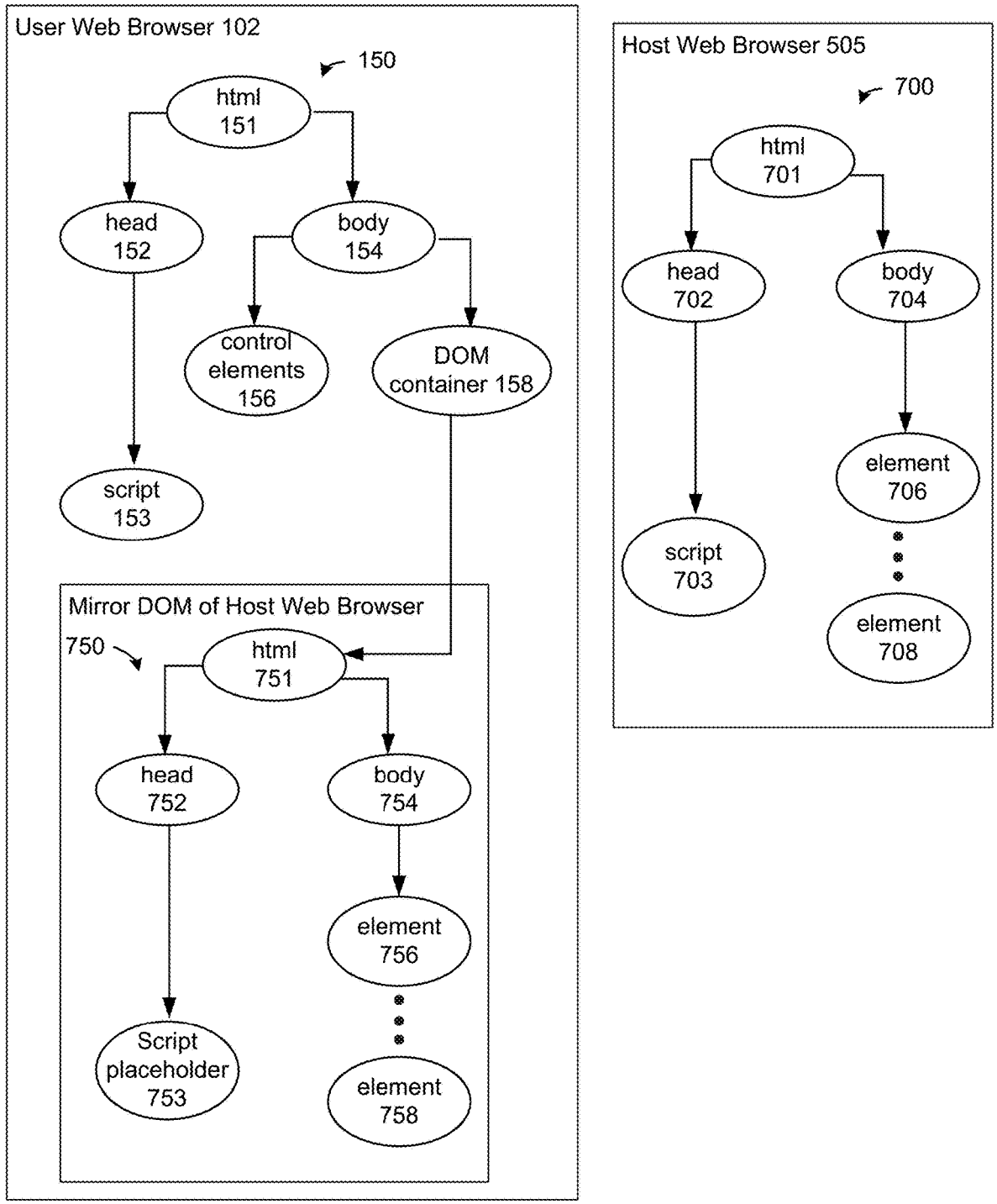
FIG. 7 is a diagram illustrating examples of document object models (DOMs) at the host browser service and a user web browser in accordance with the present disclosure.

FIG. 7 is a diagram illustrating example DOMs at the host web browser service 505 and the user web browser 102 in accordance with the present disclosure. As illustrated, a DOM may be a cross-platform and language-independent interface that represents XML or HTML documents (used to display contents of a web page) as a tree structure (as shown in FIG. 7), where nodes may be objects representing a part of the document. In some implementations, a DOM may be changed to reflect changes in the structure, style or content of the XML or HTML document. A web browser may, for example, use a DOM to render a web page and display contents of the web page to a user.

The example DOM 700 shown in FIG. 7 may, for example, be generated and stored at the host web browser 505, and may include a parent node 701 (html), a node 702 (head), a node 703 (script), a node 704 (body), a node 706 (element), and a node 708 (element). It should be understood that the nodes may correspond to various portions of the HTML document, such as the head, body, script, element, etc., portions defined in a HTML document corresponding to a web page.

The user web browser 102 may generate and store a DOM 150 that includes a parent node 151 (html), a node 152 (head), a node 153 (script), a node 154 (body), and a node 156 (control elements). The DOM 150 at the user web browser 102 may also include a node 158 that represents a DOM container that points to a mirror DOM 750 of the host web browser. The mirror DOM 750 may be generated by the user web browser 102 using the data representing the DOM 700 received from the host web browser service 110. As shown, the DOM 750 may be a mirror of the DOM 700 in that it may have the same number of nodes and information associated with the nodes. For the script node, the node 753 is a script placeholder. Script nodes may react to user inputs and modify the respective DOM. Script placeholder nodes, such as node 753, enables the script node 703 running on host web browser 505 to react to all user inputs, modify the DOM and provide the modified DOM to the user web browser 102. This ensures that the host web browser 505 is the only trusted DOM source.

When a user web browser 102 requests access to a web page hosted at the web server 108, the host web browser 505 may be used to access the web server 108. The web page contents at the host web browser 505 may be made to match the web page contents at the user web browser 102 by implementing changes to the DOM at the host web browser 505 and sending those changes to the user web browser 102. As shown in FIG. 7, the DOM at the user web browser 102 may include a DOM container node (e.g., node 158), and the user web browser 102 may rebuild the DOM, using the changes provided by the host web browser 505, within the DOM container element. The host web browser 505 may access the web server 108 through the proxy server 503 and may cache some or all resource files associated with the web page, such as CSS, images, fonts, and the like. The user web browser 102 may use the cached resource files when rebuilding the DOM. After rebuilding, the DOM 750 of the user web browser 102 may mirror the DOM 700 of the host web browser 505. When there is a user event/input received at the user web browser 102, such as a mouse click, a mouse over, mouse out, keyboard input, etc., and if the user event has a target (e.g., the element at node 756), then the event at that element can be replayed in the host web browser 505 at the corresponding node 706 (e.g., using the host browser API). As such, any user events in the user web browser 102 may be reflected in the host web browser 505. In some implementations, because all DOM changes may be provided by the host web browser 505 to the user web browser 102 through the web socket server 202, the web socket server 202 may record all the changes to the DOM. When the user switches from the user web browser 102 to the user web browser 104, for example, the DOM changes may be provided to the user web browser 104 to enable the user web browser 104 to rebuild the DOM (so the DOM at the host web browser 505 will be the same as the DOM at the user web browsers 102 and 104) and the user can continue working with the web page in the other user web browser. In some embodiments, the host browser service 110 may provide all DOM changes to the user web browser 102 so that it can 'replay' the changes to the web pages, like a session recording. In other embodiments, the host browser service 110 may provide the latest modified DOM to the user web browser 102 or to another user web browser for switching or collaboration purposes.

Figure 8:
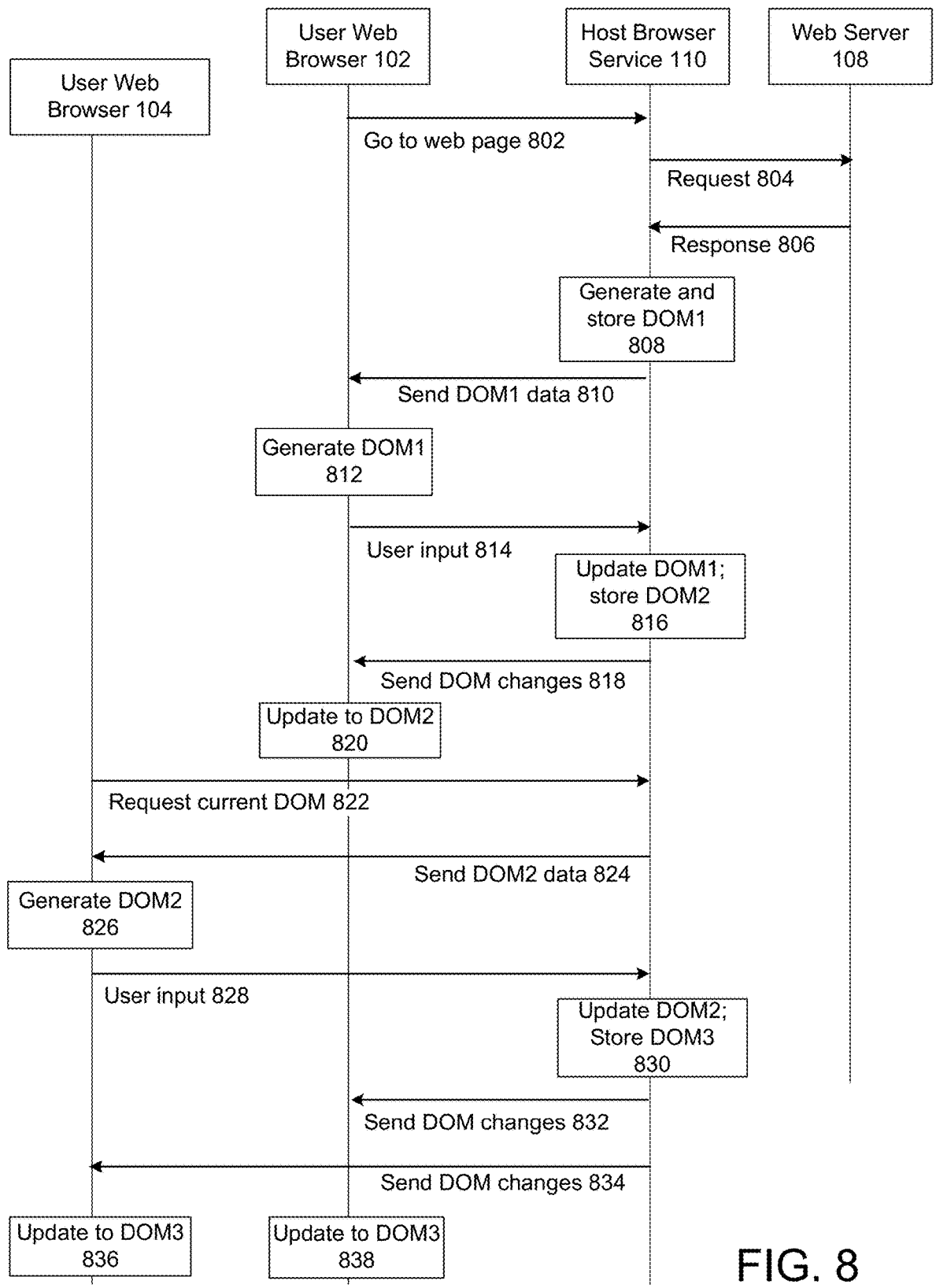
FIG. 8 illustrates an example signal flow between user web browsers and the host browser to enable collaboration in accordance with the present disclosure.

FIG. 8 illustrates an example signal flow between user web browsers 102 and 104 and the host browser service 110 to enable collaboration with respect to a web page in accordance with the present disclosure. A first user may launch the host browser service 110 via a first client device 202 (and as described in connection with FIG. 6A), and the host browser service 110 may generate and an assign a session identifier to identify the interaction and related data between the first user and the host browser service 110.

After launching the host browser service 110, the first user may use the user web browser 102 to access a web page. As shown in FIG. 8, the user web browser 102 may send (802) the request to access the web page to the host browser service 110. The host browser service 110 may send (804) an HTTP request for the contents of the requested web page to the web server 108 that hosts the web page. The web server 108 may send (806) an HTTP response including data representing the contents of the web page to the host browser service 110. The host browser service 110 may generate and store (808) a DOM (e.g., DOM1) using the data received from the web server 108. The host browser service 110 may associate the DOM1 with the session identifier.

The host browser service 110 may send (810) data representing DOM1 to the user web browser 102, and the user web browser 102 may generate (812) a mirror DOM1 using the received data. The user web browser 102 may display contents of the web page using the mirror DOM1. The user web browser 102 may receive user input from the first user and may send (814) the user input to the host browser service 110. As described above in connection with FIG. 6C, the host browser service 110 may determine changes to the DOM1 caused by the user input. The host browser service 110 may update/modify the DOM1 and store (816) DOM2 representing the contents of the web page as modified by the user input. The host browser service may associate the DOM2 with the session identifier. The host browser service 110 may send (818) data representing the DOM changes (the difference between DOM1 and DOM2) to the user web browser 102. The user web browser 102 may update/modify (820) the DOM1 using the data received from the host browser service 110 to store a mirror DOM2. The user web browser 102 may display contents of the web page using the mirror DOM2.

A second user may launch the host browser service 110 via a second client device 202 (and as described in connection with FIG. 6A), and may provide, during the launch, the session identifier associated with the interaction between the user web browser 102 and the host browser service 110. In some embodiments, the second user may provide some other information or data corresponding to the session identifier that the host browser service 110 may use to determine that the second user wishes to collaborate with the first user or wishes to join the session associated with the first user. In some implementations, the host browser service 110 may send a notification to the first client device 202 notifying the first user that the second user is joining the session, and/or the host browser service 110 may send a message to the first client device 202 requesting the first user's permission to allow the second user to join the session.

After the second user joins the session, the second user may use the user web browser 104 to access the web pages requested by the first user in the same manner as the user web browser 102. The user web browser 104 may send (822) a request to the host browser service 110 for the current DOM associated with the session, so that the user web browser 104 can display the contents of the web page as they are displayed by the user web browser 102. The host browser service 110 may send (824) data representing the DOM2, after determining that DOM2 is the current DOM associated with the session identifier. The user web browser 104 may generate (826) a mirror DOM2 using the received data. The user web browser 104 may display contents of the web page using the mirror DOM2.

The user web browser 104 may receive user input from the second user and may send (828) the user input to the host browser service 110. As described above in connection with FIG. 6C, the host browser service 110 may determine changes to the DOM2 caused by the user input. The host browser service 110 may update/modify the DOM2 and store (830) DOM3 representing the contents of the web page as modified by the user input. The host browser service may associate the DOM3 with the session identifier. The host browser service 110 may send (832) data representing the DOM changes (the difference between DOM2 and DOM3) to the user web browser 104. The host browser service 110 may also send (834) the data representing the DOM changes (the difference between DOM2 and DOM3) to the user web browser 102, since the user web browser 102 and 104 are in the same session of the host browser services 110.

The user web browser 104 may update/modify (836) the DOM2 using the data received from the host browser service 110 to store a mirror DOM3. The user web browser 104 may display contents of the web page using the mirror DOM3. The user web browser 102 may update/modify (838) the DOM1 using the data received from the host browser service 110 to store a mirror DOM3. The user web browser 102 may display contents of the web page using the mirror DOM3. In this manner, the host browser service 110 may send changes made to the web page by the first user to the second user's device and vice-versa, enabling the two users to collaborate with respect to a web page. For example, the first user may be entering information in data fields of the web page, and the second user is able to see the data being entered by the first user.

Figure 9:
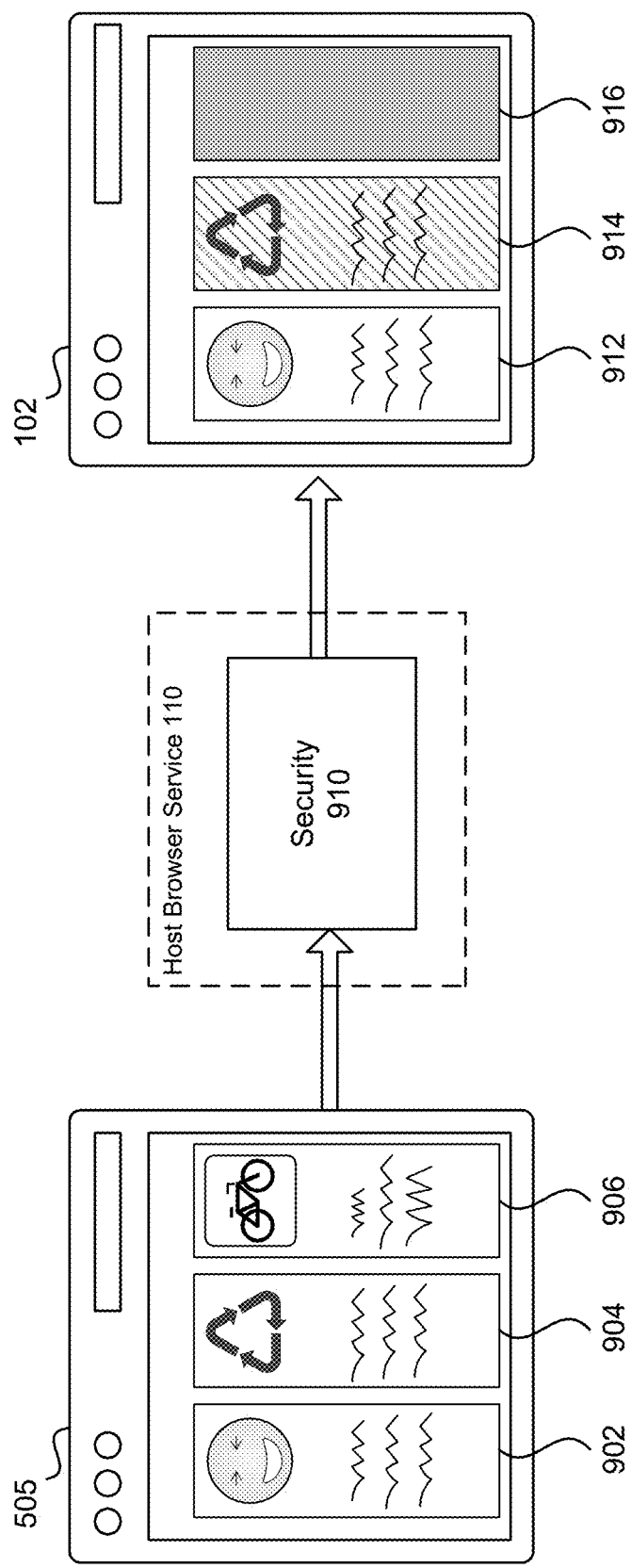
FIG. 9 is a diagram illustrating an example system for enabling security policies with respect to displaying web page content on user web browsers in accordance with the present disclosure.

FIG. 9 is a diagram illustrating an example system for enabling security policies with respect to displaying web page content on user web browsers in accordance with the present disclosure. In some embodiments, the host browser service 110 may include a security component 910 that may be configured to receive data relating to security policies and/or filtering policies corresponding to certain portions of a web page. A web page administrator, an administrator for the host browser service 110, an administrator for the user's organization, and/or another type of user may want to set security policies and access controls with respect to portions (e.g., elements) of a web page. The security component 910 may receive a security policy and/or an access control policy relating to how certain elements of a web page may be displayed based on the user web browser 102 (or 104) satisfying certain criteria. As such, the host browser service 110 may cause different user web browsers to display different content from the same web page based on the security policies associated with the web page, the user, and/or the client device.

In some embodiments, the security policy may define a browser-level policy related to the web browser displaying the content. The browser-level policy may specify a browser type, a device type, a network status, and/or other data related to the client device 202 used to display the web page. For example, a browser-level policy may indicate that the web page contents may be displayed only if the user web browser is Google Chrome or Internet Explorer. The security component 910 may identify the type of user web browser 102, determine if it satisfies the criteria indicated by the browser-level policy, and determine to send data to the user web browser 102 to enable it to display the contents of the web page. In another example, the browser-level policy may indicate that the network status has to be an intranet or a secured network access in order for certain contents to be displayed.

In other embodiments, the security policy may define an element-level policy related to the contents of the web page. The element-level policy may specify a sensitivity level (e.g., low, medium, high) for certain elements (e.g., an element of the HTML or XML document corresponding to a particular portion of the contents of the web page) of the web page. For example, the element-level policy may indicate that the element corresponding to <table id="sales-info"> is associated with high sensitivity. The security component 910 may identify elements within the DOM that are associated with a particular level of sensitivity, may determine what criteria a user web browser has to satisfy to display such elements, and cause the user web browser 102 to display the contents of the web page accordingly.

In other embodiments, the security policy may define a type of channel to use to transmit the web page contents. In an example embodiment, the security policy may specify which channel to use based on the browser-level policy and/or the element-level policy being satisfied. In an example embodiment, the host browser service 110 may employ three channels to send web page content to a user web browser 102. As used herein, a channel refers to, for example, a data/communication connection to transfer data from the host web browser to the user web browser. In some embodiments, the host browser service 110 may employ a first channel that may be used to transfer complete information related to an element of the web page so that the element is built/rendered at the user web browser 102 in the same manner as it is built/rendered at the host web browser 505. In some embodiments, the host browser service 110 may additionally or alternatively employ a second channel that may be used to transfer a snapshot of the element (e.g., an image of the web page contents corresponding to the element), and send the snapshot of the element to the web socket server 502. The web socket server 502 may change the corresponding element in the DOM to represent an empty element with the same size as the original element, send the modified DOM to the user web browser 102, thus causing it to display a snapshot of the corresponding original contents of the web page. The user thus be able to see the contents corresponding to such an element but may not not able to interact with, copy from, click on, etc., that element. In some embodiments, the host browser service 110 may additionally or alternatively employ a third channel that may be used to transfer only the size of the element to the user web browser 102 and cause the user web browser 102 to display a blank area instead of the contents of the web page. The web socket server 502 may, for example, modify the corresponding element in the DOM and send the modified DOM to the user web browser 102, thus causing the user web browser 102 to display a blank area of the same size as the original element. The user may thus not be able to see the contents of the web page corresponding to the element. The blank area may, however, act as a placeholder so that the layout of the web page remains the same.

To illustrate, FIG. 9 shows the host web browser 505 displaying the entire contents of a web page. As shown, the web page may include content that corresponds to an element 902, content that corresponds to an element 904, and content that corresponds to an element 906. In a non-limiting example, a security policy may specify that the element 902 has low sensitivity and that the information corresponding to the element 902 is to be transferred using the first channel. Accordingly, the security component 910 may send data to the user web browser 102 to display element 912, which as shown in FIG. 9 matches how the element 902 is displayed at the host web browser 505. Another security policy associated with the web page may indicate that the element 904 is associated with high sensitivity and that the information corresponding to the element 904 is to be transferred using the second channel. Accordingly, the security component 910 may send data to the user web browser 102 to display element 914, which as shown in FIG. 9 displays an image/snapshot of the element 904, such that the user can see it but is unable to interact with it. Another security policy associated with the web page may indicate that the element 906 is associated with high sensitivity if the user web browser type is not Google Chrome, and that the information corresponding to the element 906 is to be transferred using the third channel. The security component 910 may determine that the user web browser 102 is not Google Chrome, and accordingly may send data to the user web browser 102 causing the user web browser 102 to display a blank area 916 instead of element 906.

In this manner, security policies may be used to filter or define how content is displayed for different users, client devices and/or user web browsers. The security component 910 may, for example, use the monitoring agent 226 shown in FIG. 2B, which may include Citrix Analytics, and/or a gateway appliance such as Citrix Secure Web Gateway to evaluate user web browsers, client devices, network status, etc., to determine a security score. The security component 910 may use the security score to determine if the conditions defined in the security policy are met to determine how to transfer the information representing the web page contents.

F. Example Implementations of Methods, Systems, and Computer-Readable Media in Accordance with the Present Disclosure The following paragraphs (M1) through (M13) describe examples of methods that may be implemented in accordance with the present disclosure.

(M1) A computing system may perform a method that involves receiving a request from a first endpoint device to access a web page, where the web page is accessible via a web browser of the first endpoint device in communication with a host web browser of the computing system. The method further involves generating a DOM at the host web browser representing contents of the web page, providing data to the web browser enabling replication of the DOM at the first endpoint device to display the contents of the web page in the web browser, detecting a change in access to the web page via the first endpoint device to a second endpoint device, and providing data to the second endpoint device to replicate the web page based on the DOM so as to enable continued access to the web page from the second endpoint device in the same fashion as the first endpoint device.

(M2) A method may be performed as described in paragraph (M1), and may further comprise receiving a user input from the web browser of the first endpoint device, where the user input causing a change in the contents of the web page, modifying the DOM at the host web browser to represent the change caused by the user input, and providing data to the first endpoint device to replicate the web page based on the modified DOM so as to enable the first endpoint device access to the changed contents of the web page.

(M3) A method may be performed as described in paragraph (M2), and may further comprise providing data to the second endpoint device to replicate the web page based on the modified DOM so as to enable the second endpoint device access to the changed contents of the web page.

(M4) A method may be performed as described in any of paragraphs (M1) through (M3), wherein the request from the first endpoint device includes a session identifier, and the method may further comprise receiving a request from the second endpoint device to access the web page via a web browser of the second endpoint device, determining that the request from the second endpoint device includes the session identifier, and providing the data to the second endpoint device to replicate the web page in response to the request from the second endpoint device including the session identifier.

(M5) A method may be performed as described in any of paragraphs (M1) through (M4), wherein the DOM includes at least one element representing a portion of the contents of the web page and the method may further comprise identifying a security level associated with the element, and providing data to the first endpoint device to enable the web browser of the first endpoint device to display the portion of the contents corresponding to the element according to the security level.

(M6) A method may be performed as described in paragraph (M5), wherein the security level indicates that the web browser of the first endpoint device is associated with low security, and wherein providing the data to the first endpoint device comprises sending size information corresponding to the element to cause the web browser of the first endpoint device to display a blank area in place of the portion of the contents corresponding to the element, the blank area being displayed using the size information (M7) A method may be performed as described in any of paragraphs (M5) wherein the security level indicates that the web browser of the first endpoint device is associated with medium security, and wherein providing the data to the first endpoint device comprises sending an image corresponding to the element to cause the web browser of the first endpoint device to display the image in place of the portion of contents corresponding to the element.

(M8) A method may be performed as described in any of paragraphs (M1) through (M7), and may further comprise sending a request to a web server hosting the web page for the contents of the web page.

(M9) A computing system may perform a method that involves receiving contents of a web page, generating, at a host web browser, a document object model (DOM) representing the contents of the web page, providing data to a first web browser of a first endpoint device, where the data enabling replication of the DOM at the first endpoint device so as to display the contents of the web page in the first web browser, detecting a request to access the web page in a fashion same as the first endpoint device, and providing the data to a second web browser of a second endpoint device, the data enabling replication of the DOM at the second endpoint device so as to enable the second web browser access to the web page in a fashion same as the first endpoint device.

(M10) A method may be performed as described in paragraph (M9), and may further comprise receiving a request from the first endpoint device to access the web page, sending a request to a server hosting the web page, where the request is a Hypertext Transfer Protocol (HTTP) request for the contents of the web page, receiving data from the server representing the contents of the web page, and generating the DOM using the data.

(M11) A method may be performed as described in paragraph (M9) or (M10), and may further comprise receiving user input from the first web browser, detecting a change in the DOM caused by the user input, modifying the DOM at the host web browser, providing data to the first web browser enabling replication of the modified DOM at the first endpoint device so as to display the contents of the web page changed by the user input, and providing the data to the second web browser enabling replication of the modified DOM at the second endpoint device so as to enable the second web browser access to the web page in a fashion same as the first endpoint device.

(M12) A method may be performed as described in any of paragraphs (M9) through (M11), and may further comprise receiving a security policy from a server hosting the web page, the security policy associated with at least one of device type, web browser type and network status.

(M13) A method may be performed as described in any of paragraphs (M9) through (M12), and may further comprise identifying a security policy associated with an element of the DOM, where the element representing a portion of the contents of the web page, determining that the security policy relates to a device type, identifying device information associated with the first endpoint device, and determining that the device information does not satisfy the security policy, wherein providing the data to the first web browser comprises providing size information corresponding to the element to cause the first web browser to display a blank area in place of the portion of the contents corresponding to the element, the blank area being displayed using the size information.

The following paragraphs (S1) through (S13) describe examples of systems that may be implemented in accordance with the present disclosure.

(S1) A system may comprise at least one processor and at least one computer-readable medium encoded with instructions which, when executed by the at least one processor, may cause the system to receive a request from a first endpoint device to access a web page, the web page being accessible via a web browser of the first endpoint device in communication with a host web browser of the system, generate a document object model (DOM) at the host web browser, the DOM representing contents of the web page, provide data to the web browser, where the data enabling replication of the DOM at the first endpoint device so as to display the contents of the web page in the web browser, detect a change in access to the web page via the first endpoint device to a second endpoint device, and provide data to the second endpoint device to replicate the web page based on the DOM provided by the host web browser, so as to enable continued access to the web page from the second endpoint in a fashion the same as the first endpoint device.

(S2) A system may be configured as described in paragraph (S1), wherein the computer-readable medium is encoded with additional instructions which, when executed by the at least one processor, may further cause the system to receive a user input from the web browser of the first endpoint device, the user input causing a change in the contents of the web page, modify the DOM at the host browser to represent the change caused by the user input, and provide data to the first endpoint device to replicate the web page based on the modified DOM, so as to enable the first endpoint device access to the changed contents of the web page.

(S3) A system may be configured as described in paragraph (S2), wherein the computer-readable medium is encoded with additional instructions which, when executed by the at least one processor, may further cause the system to provide data to the second endpoint device to replicate the web page based on the modified DOM, so as to enable the second endpoint device access to the changed contents of the web page.

(S4) A system may be configured as described in any of paragraphs (S1) through (S3), wherein the request from the first endpoint device includes a session identifier, and wherein the computer-readable medium is encoded with additional instructions which, when executed by the at least one processor, may further cause the system to receive a request from the second endpoint device to access the web page via a web browser of the second endpoint device, determine that the request from the second endpoint device includes the session identifier, and provide the data to the second endpoint device to replicate the web page in response to the request from the second endpoint device including the session identifier.

(S5) A system may be configured as described in any of paragraphs (S1) through (S4), wherein the DOM includes at least one element representing a portion of the contents of the web page, and wherein the computer-readable medium is encoded with additional instructions which, when executed by the at least one processor, may further cause the system to identify a security level associated with the element, and provide data to the first endpoint device to enable the web browser of the first endpoint device to display the portion of the contents corresponding to the element according to the security level.

(S6) A system may be configured as described in paragraph (S5), wherein the security level indicates that the web browser of the first endpoint device is associated with low security, and wherein the instructions, when executed by the at least one processor, that cause the system to provide the data to the first endpoint device may further cause the system to send size information corresponding to the element to cause the web browser of the first endpoint device to display a blank area in place of the portion of the contents corresponding to the element, the blank area being displayed using the size information.

(S7) A system may be configured as described in paragraph (S5), wherein the security level indicates that the web browser of the first endpoint device is associated with medium security, and wherein the instructions, when executed by the at least one processor, that cause the system to provide the data to the first endpoint device may further cause the system to send an image corresponding to the element to cause the web browser of the first endpoint device to display the image in place of the portion of contents corresponding to the element.

(S8) A system may be configured as described in any of paragraphs (S1) through (S7), wherein the computer-readable medium is encoded with additional instructions which, when executed by the at least one processor, may further cause the system to send a request to a web server hosting the web page for the contents of the web page.

(S9) A system may comprise at least one processor and at least one computer-readable medium encoded with instructions which, when executed by the at least one processor, may cause the system to receive contents of a web page, generating, at a host web browser, a document object model (DOM) representing the contents of the web page, provide data to a first web browser of a first endpoint device, where the data enabling replication of the DOM at the first endpoint device so as to display the contents of the web page in the first web browser, detect a request to access the web page in a fashion same as the first endpoint device, and provide the data to a second web browser of a second endpoint device, the data enabling replication of the DOM at the second endpoint device so as to enable the second web browser access to the web page in a fashion same as the first endpoint device.

(S10) A system may be configured as described in paragraph (S9), wherein the computer-readable medium is encoded with additional instructions which, when executed by the at least one processor, may further cause the system to receive a request from the first endpoint device to access the web page, send a request to a server hosting the web page, where the request is a Hypertext Transfer Protocol (HTTP) request for the contents of the web page, receive data from the server representing the contents of the web page, and generate the DOM using the data.

(S11) A system may be configured as described in paragraph (S9) or (S10), wherein the computer-readable medium is encoded with additional instructions which, when executed by the at least one processor, may further cause the system to receive user input from the first web browser, detect a change in the DOM caused by the user input, modify the DOM at the host web browser, provide data to the first web browser enabling replication of the modified DOM at the first endpoint device so as to display the contents of the web page changed by the user input, and provide the data to the second web browser enabling replication of the modified DOM at the second endpoint device so as to enable the second web browser access to the web page in a fashion same as the first endpoint device.

(S12) A system may be configured as described in any of paragraphs (S9) through (S11), wherein the computer-readable medium is encoded with additional instructions which, when executed by the at least one processor, may further cause the system to receive a security policy from a server hosting the web page, the security policy associated with at least one of device type, web browser type and network status.

(S13) A system may be configured as described in any of paragraphs (S9) through (S12), wherein the computer-readable medium is encoded with additional instructions which, when executed by the at least one processor, may further cause the system to identify a security policy associated with an element of the DOM, where the element representing a portion of the contents of the web page, determine that the security policy relates to a device type, identify device information associated with the first endpoint device, and determine that the device information does not satisfy the security policy, wherein the instructions that cause the system to provide the data to the first web browser may further cause the system to provide size information corresponding to the element to cause the first web browser to display a blank area in place of the portion of the contents corresponding to the element, the blank area being displayed using the size information.

The following paragraphs (CRM1) through (CRM13) describe examples of computer-readable media that may be implemented in accordance with the present disclosure.

(CRM1) At least one non-transitory, computer-readable medium may be encoded with instructions which, when executed by at least one processor included in a first computing system, cause the at least one processor to receive a request from a first endpoint device to access a web page, the web page being accessible via a web browser of the first endpoint device in communication with a host web browser of the system, generate a document object model (DOM) at the host web browser, the DOM representing contents of the web page, provide data to the web browser, where the data enabling replication of the DOM at the first endpoint device so as to display the contents of the web page in the web browser, detect a change in access to the web page via the first endpoint device to a second endpoint device, and provide data to the second endpoint device to replicate the web page based on the DOM provided by the host web browser, so as to enable continued access to the web page from the second endpoint in a fashion the same as the first endpoint device.

(CRM2) At least one non-transitory, computer-readable medium may be encoded with instructions as described in paragraph (CRM1), and may be further encoded with additional instructions which, when executed by the at least one processor, may further cause the at least one processor to receive a user input from the web browser of the first endpoint device, the user input causing a change in the contents of the web page, modify the DOM at the host browser to represent the change caused by the user input, and provide data to the first endpoint device to replicate the web page based on the modified DOM, so as to enable the first endpoint device access to the changed contents of the web page.

(CRM3) At least one non-transitory, computer-readable medium may be encoded with instructions as described in paragraph (CRM1) or paragraph (CRM2), may be further encoded with additional instructions which, when executed by the at least one processor, may further cause the at least one processor to provide data to the second endpoint device to replicate the web page based on the modified DOM, so as to enable the second endpoint device access to the changed contents of the web page.

(CRM4) At least one non-transitory, computer-readable medium may be encoded with instructions as described in any of paragraphs (CRM1) through (CRM3), wherein the request from the first endpoint device includes a session identifier, and may be further encoded with additional instructions which, when executed by the at least one processor, may further cause the at least one processor to receive a request from the second endpoint device to access the web page via a web browser of the second endpoint device, determine that the request from the second endpoint device includes the session identifier, and provide the data to the second endpoint device to replicate the web page in response to the request from the second endpoint device including the session identifier.

(CRM5) At least one non-transitory, computer-readable medium may be encoded with instructions as described in any of paragraphs (CRM1) through (CRM4), wherein the DOM includes at least one element representing a portion of the contents of the web page, and the at least one non-transitory, computer-readable medium may be further encoded with additional instructions which, when executed by the at least one processor, may further cause the at least one processor to identify a security level associated with the element, and provide data to the first endpoint device to enable the web browser of the first endpoint device to display the portion of the contents corresponding to the element according to the security level.

(CRM6) At least one non-transitory, computer-readable medium may be encoded with instructions as described in paragraph (CRM5), wherein the security level indicates that the web browser of the first endpoint device is associated with low security, and the at least one computer-readable medium may be further encoded with additional instructions which, when executed by the at least one processor, may further cause the at least one processor to provide the data to the first endpoint device may further cause the system to send size information corresponding to the element to cause the web browser of the first endpoint device to display a blank area in place of the portion of the contents corresponding to the element, the blank area being displayed using the size information.

(CRM7) At least one non-transitory, computer-readable medium may be encoded with instructions as described in paragraph (CRM5), wherein the security level indicates that the web browser of the first endpoint device is associated with medium security, and may be further encoded with additional instructions which, when executed by the at least one processor, may further cause the at least one processor to provide the data to the first endpoint device may further cause the system to send an image corresponding to the element to cause the web browser of the first endpoint device to display the image in place of the portion of contents corresponding to the element.

(CRM8) At least one non-transitory, computer-readable medium may be encoded with instructions as described in any of paragraphs (CRM1) through (CRM7), and may be further encoded with additional instructions which, when executed by the at least one processor, further cause the at least one processor to send a request to a web server hosting the web page for the contents of the web page.

(CRM9) At least one non-transitory, computer-readable medium may be encoded with instructions which, when executed by at least one processor included in a first computing system, cause the at least one processor to receive contents of a web page, generating, at a host web browser, a document object model (DOM) representing the contents of the web page, provide data to a first web browser of a first endpoint device, where the data enabling replication of the DOM at the first endpoint device so as to display the contents of the web page in the first web browser, detect a request to access the web page in a fashion same as the first endpoint device, and provide the data to a second web browser of a second endpoint device, the data enabling replication of the DOM at the second endpoint device so as to enable the second web browser access to the web page in a fashion same as the first endpoint device.

(CRM10) At least one non-transitory, computer-readable medium may be encoded with instructions as described in paragraph (CRM9), may be further encoded with additional instructions which, when executed by the at least one processor, may further cause the at least one processor to receive a request from the first endpoint device to access the web page, send a request to a server hosting the web page, where the request is a Hypertext Transfer Protocol (HTTP) request for the contents of the web page, receive data from the server representing the contents of the web page, and generate the DOM using the data.

(CRM11) At least one non-transitory, computer-readable medium may be encoded with instructions as described in paragraph (CRM9) or (CRM10), may be further encoded with additional instructions which, when executed by the at least one processor, may further cause the at least one processor to receive user input from the first web browser, detect a change in the DOM caused by the user input, modify the DOM at the host web browser, provide data to the first web browser enabling replication of the modified DOM at the first endpoint device so as to display the contents of the web page changed by the user input, and provide the data to the second web browser enabling replication of the modified DOM at the second endpoint device so as to enable the second web browser access to the web page in a fashion same as the first endpoint device.

(CRM12) At least one non-transitory, computer-readable medium may be encoded with instructions as described in any of paragraphs (CRM9) through (CRM11), may be further encoded with additional instructions which, when executed by the at least one processor, may further cause the at least one processor to receive a security policy from a server hosting the web page, the security policy associated with at least one of device type, web browser type and network status.

(CRM13) At least one non-transitory, computer-readable medium may be encoded with instructions as described in any of paragraphs (CRM9) through (CRM12), may be further encoded with additional instructions which, when executed by the at least one processor, may further cause the at least one processor to identify a security policy associated with an element of the DOM, where the element representing a portion of the contents of the web page, determine that the security policy relates to a device type, identify device information associated with the first endpoint device, and determine that the device information does not satisfy the security policy, wherein the instructions that cause the system to provide the data to the first web browser may further cause the system to provide size information corresponding to the element to cause the first web browser to display a blank area in place of the portion of the contents corresponding to the element, the blank area being displayed using the size information.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
receiving, by a computing system, a request from a first endpoint device to access a web page, wherein a web browser of the first endpoint device accesses the web page via a communication with a host web browser of the computing system;
sending, by the computing system, a request to a web server hosting the web page for the contents of the web page;
receiving, by the computing system, a version of the contents of the web page modified to include a script for detecting changes in a document object model (DOM) representing contents of the web page;
generating, by the computing system, the DOM representing the contents of the web page;
providing, by the computing system, data to the web browser, the data enabling replication of the DOM at the first endpoint device so as to display the contents of the web page in the web browser;

detecting, by the computing system responsive to the script, a change in access to the web page via the first endpoint device to a second endpoint device; and providing, by the computing system, data to the second endpoint device to replicate the web page based on the DOM provided by the host web browser, so as to enable continued access to the web page from the second endpoint device in a same fashion as the first endpoint device.

2. The method of claim 1, further comprising:

receiving, by the computing system, a user input from the web browser of the first endpoint device, the user input causing a change in the contents of the web page;

modifying, by the computing system, the DOM at the host web browser to represent the change caused by the user input; and providing, by the computing system, data to the first endpoint device to replicate the web page based on the modified DOM, so as to enable the first endpoint device access to the changed contents of the web page.

3. The method of claim 2, further comprising:

providing, by the computing system, data to the second endpoint device to replicate the web page based on the modified DOM, so as to enable the second endpoint device access to the changed contents of the web page.

4. The method of claim 1, wherein the request from the first endpoint device includes a session identifier, and the method further comprises:

receiving, by the computing system, a request from the second endpoint device to access the web page via a web browser of the second endpoint device;

determining, by the computing system, that the request from the second endpoint device includes the session identifier; and providing the data to the second endpoint device to replicate the web page in response to the request from the second endpoint device including the session identifier.

5. The method of claim 1, wherein the DOM includes at least one element representing a portion of the contents of the web page and the method further comprises:

identifying, by the computing system, a security level associated with the element; and providing, by the computing system, data to the first endpoint device to enable the web browser of the first endpoint device to display the portion of the contents corresponding to the element according to the security level.

6. The method of claim 5, wherein the security level indicates that the web browser of the first endpoint device is associated with low security, and wherein providing the data to the first endpoint device comprises sending size information corresponding to the element to cause the web browser of the first endpoint device to display a blank area in place of the portion of the contents corresponding to the element, the blank area being displayed using the size information.

7. The method of claim 5, wherein the security level indicates that the web browser of the first endpoint device is associated with medium security, and wherein providing the data to the first endpoint device comprises sending an image corresponding to the element to cause the web browser of the first endpoint device to display the image in place of the portion of contents corresponding to the element.

8. The method of claim 1, further comprising, in response to receiving the request from the first endpoint device to access the web page:

launching the host web browser as an instance of a host web browser software application;

generating a session identifier to identify a session between the web browser of the first endpoint device and the instance of the host web browser software application; and storing an association between the session identifier and the instance of the host web browser software application.

9. The method of claim 8, further comprising:

receiving a request from the second endpoint device to access the web page via a web browser of the second endpoint device, the request from the second endpoint device including the session identifier;

identifying the instance of the host web browser software application associated with the session identifier based on the stored association; and providing the data to the second endpoint device based on the DOM at the instance of the host web browser software.

10. A system, comprising:

at least one processor; and at least one computer-readable medium encoded with instructions which, when executed by the at least one processor, cause the system to:

receive a request from a first endpoint device to access a web page, wherein a web browser of the first endpoint device accesses the web page via a communication with a host web browser of the system;

send a request to a web server hosting the web page for the contents of the web page;

receive a version of the contents of the web page modified to include a script for detecting changes in a document object model (DOM) representing contents of the web page;

generate the DOM representing the contents of the web page;

provide data to the web browser, the data enabling replication of the DOM at the first endpoint device so as to display the contents of the web page in the web browser;

detect, responsive to the script, a change in access to the web page via the first endpoint device to a second endpoint device; and provide data to the second endpoint device to replicate the web page based on the DOM provided by the host web browser, so as to enable continued access to the web page from the second endpoint in a fashion the same as the first endpoint device.

11. The system of claim 10, wherein the computer-readable medium is encoded with additional instructions which, when executed by the at least one processor, further cause the system to:

receive a user input from the web browser of the first endpoint device, the user input causing a change in the contents of the web page;

modify the DOM at the host browser to represent the change caused by the user input; and provide data to the first endpoint device to replicate the web page based on the modified DOM, so as to enable the first endpoint device access to the changed contents of the web page.

12. The system of claim 11, wherein the computer-readable medium is encoded with additional instructions which, when executed by the at least one processor, further cause the system to:
  provide data to the second endpoint device to replicate the web page based on the modified DOM, so as to enable the second endpoint device access to the changed contents of the web page.

13. The system of claim 10, wherein the request from the first endpoint device includes a session identifier, and wherein the computer-readable medium is encoded with additional instructions which, when executed by the at least one processor, further cause the system to:
  receive a request from the second endpoint device to access the web page via a web browser of the second endpoint device;
  determine that the request from the second endpoint device includes the session identifier; and
  provide the data to the second endpoint device to replicate the web page in response to the request from the second endpoint device including the session identifier.

14. The system of claim 10, wherein the DOM includes at least one element representing a portion of the contents of the web page, and wherein the computer-readable medium is encoded with additional instructions which, when executed by the at least one processor, further cause the system to:
  identify a security level associated with the element; and
  provide data to the first endpoint device to enable the web browser of the first endpoint device to display the portion of the contents corresponding to the element according to the security level.

15. The system of claim 14, wherein the security level indicates that the web browser of the first endpoint device is associated with low security, and
  wherein the instructions, when executed by the at least one processor, that cause the system to provide the data to the first endpoint device further cause the system to send size information corresponding to the element to cause the web browser of the first endpoint device to display a blank area in place of the portion of the contents corresponding to the element, the blank area being displayed using the size information.

16. The system of claim 14, wherein the security level indicates that the web browser of the first endpoint device is associated with medium security, and
  wherein the instructions, when executed by the at least one processor, that cause the system to provide the data to the first endpoint device further cause the system to send an image corresponding to the element to cause the web browser of the first endpoint device to display the image in place of the portion of contents corresponding to the element.

17. The system of claim 10, wherein the computer-readable medium is encoded with additional instructions which, when executed by the at least one processor, further cause the system to, in response to receiving the request from the first endpoint device to access the web page:
  launch the host web browser as an instance of a host web browser software application;
  generate a session identifier to identify a session between the web browser of the first endpoint device and the instance of the host web browser software application; and
  store an association between the session identifier and the instance of the host web browser software application.

18. The system of claim 17, wherein the computer-readable medium is encoded with additional instructions which, when executed by the at least one processor, further cause the system to:
  receive a request from the second endpoint device to access the web page via a web browser of the second endpoint device, the request from the second endpoint device including the session identifier;
  identify the instance of the host web browser software application associated with the session identifier based on the stored association; and
  provide the data to the second endpoint device based on the DOM at the instance of the host web browser software.

* * * * *